US006799202B1

(12) United States Patent
Hankinson et al.

(10) Patent No.: US 6,799,202 B1
(45) Date of Patent: Sep. 28, 2004

(54) FEDERATED OPERATING SYSTEM FOR A SERVER

(75) Inventors: Bradley K. T. Hankinson, San Diego, CA (US); Brian D. Suggs, San Diego, CA (US)

(73) Assignee: Hachiro Kawaii (JP)

( * ) Notice: Subject to any disclaimer, the term of this patent is extended or adjusted under 35 U.S.C. 154(b) by 0 days.

(21) Appl. No.: 09/464,945

(22) Filed: Dec. 16, 1999

(51) Int. Cl.$^7$ .............................................. G06F 15/16
(52) U.S. Cl. ...................... 709/219; 709/222; 709/203; 709/220
(58) Field of Search ................................ 709/203, 226, 709/229, 222, 219, 220

(56) References Cited

U.S. PATENT DOCUMENTS

| | | | |
|---|---|---|---|
| 5,634,053 A | | 5/1997 | Noble et al. ................. 395/604 |
| 5,774,660 A | | 6/1998 | Brendel et al. |
| 6,003,079 A | * | 12/1999 | Friedrich et al. ............ 709/224 |
| 6,141,759 A | * | 10/2000 | Braddy ......................... 713/201 |
| 6,182,139 B1 | * | 1/2001 | Brendel ....................... 709/226 |
| 6,195,680 B1 | * | 2/2001 | Goldszmidt et al. ......... 709/203 |
| 6,393,483 B1 | * | 5/2002 | Latif et al. ................... 709/226 |
| 6,438,652 B1 | * | 8/2002 | Jordan et al. ................ 711/120 |
| 6,502,103 B1 | * | 12/2002 | Frey et al. ............... 707/103 R |
| 6,564,251 B2 | * | 5/2003 | Katariya et al. ............. 709/214 |

FOREIGN PATENT DOCUMENTS

| | | | |
|---|---|---|---|
| EP | 0817445 A2 | 1/1998 | |
| EP | 0848341 A2 | 6/1998 | |
| EP | 0 848 341 A2 | 6/1998 | ........... G06F/17/30 |

(List continued on next page.)

OTHER PUBLICATIONS

Srinivasan et al., "Faster IP Lookups Using Controlled Prefix Expansion," ACM 0–89791–982–3/98/0006, 1998, pp. 1–10.*

International Search Report for PCT/US00/33323.

Goldszmidt, German S., "Load Management For Scaling Up Internet Services", IEEE 1998, pp. 828–835.

Hunt et al, "Network Dispatcher: A Connection Router For Scalable Internet Services", Computer Networks And ISDN Systems, 30 (1998( p. 347–357.

*Appliances Challenge the Server Market, Computer*, Sixto Ortiz, Jr., pp. 11–13, Sep., 1999.

*Primary Examiner*—Ario Etienne
*Assistant Examiner*—Bradley Edelman
(74) *Attorney, Agent, or Firm*—Sierra Patent Group, Ltd.

(57) ABSTRACT

A server, methods, and software, for implementing a distributed, high capacity, high speed, operating system are disclosed. One embodiment concerns a Web server that is implemented with a plurality of members which are categorized into member classes. Each member class has a distinct specialized operating system that is optimized for its function. Together, the operating systems of the members make up an operating system referred to as the Federated Operating System™. One illustrative embodiment includes a receiver member, a dispatcher member, and a responder member. Each member has an internal network interface for coupling to an internal network which is used for communications between the members. Members can be located in the same enclosure or can be separated over large distances. Receiver members and responder members also have an external network interface for coupling to an external network such as the Internet. Receiver members receive requests from clients over the external network, and pass off data from the requests to dispatcher members over the internal network. A dispatcher member uses the internal network to send information to a responder member, instructing the responder member to send data requested by the client to the client over the external network. Preferred embodiments of the invention use address and host lookup algorithms that execute in a fixed amount of time even when searching large databases, which permits real time processing of a large number of connections.

12 Claims, 26 Drawing Sheets

FOREIGN PATENT DOCUMENTS

| | | | | |
|---|---|---|---|---|
| EP | 0 848 341 A3 | 9/2000 | ........... | G06F/17/30 |
| EP | 0 817 445 B1 | 3/2003 | ............. | G06F/9/46 |
| WO | 98/26559 A1 | 6/1998 | | |
| WO | WO 98/26559 A1 | 6/1998 | ........... | H04L/29/12 |
| WO | 99/13619 A2 | 3/1999 | | |
| WO | WO 99/13619 A2 | 3/1999 | ........... | H04L/12/56 |

\* cited by examiner

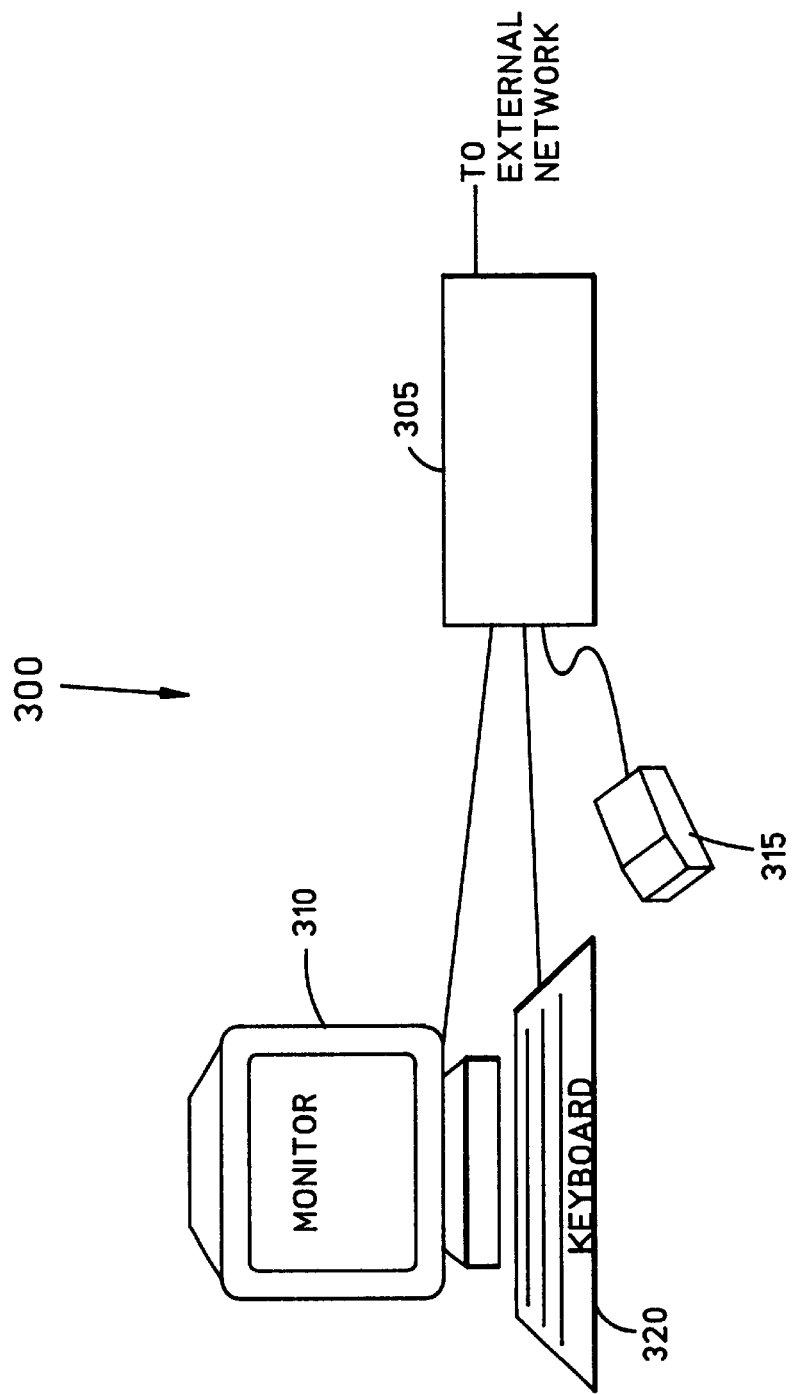

FIG. 9A1

| FIG. 9A1 | FIG. 9A |
|---|---|
| FIG. 9A2 | |

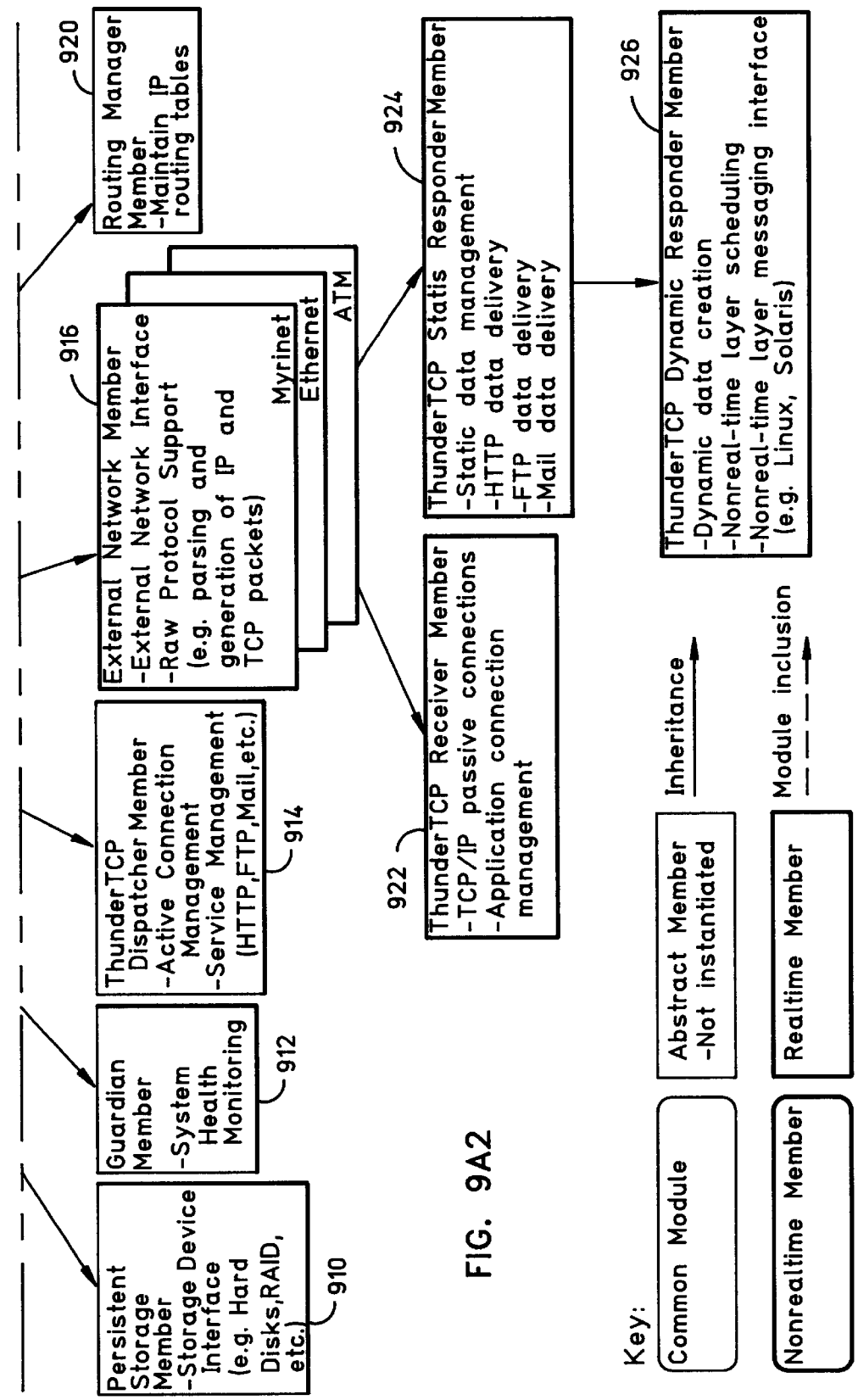
FIG. 9A2

FIG. 11
Receiver TCP Connection State Machine

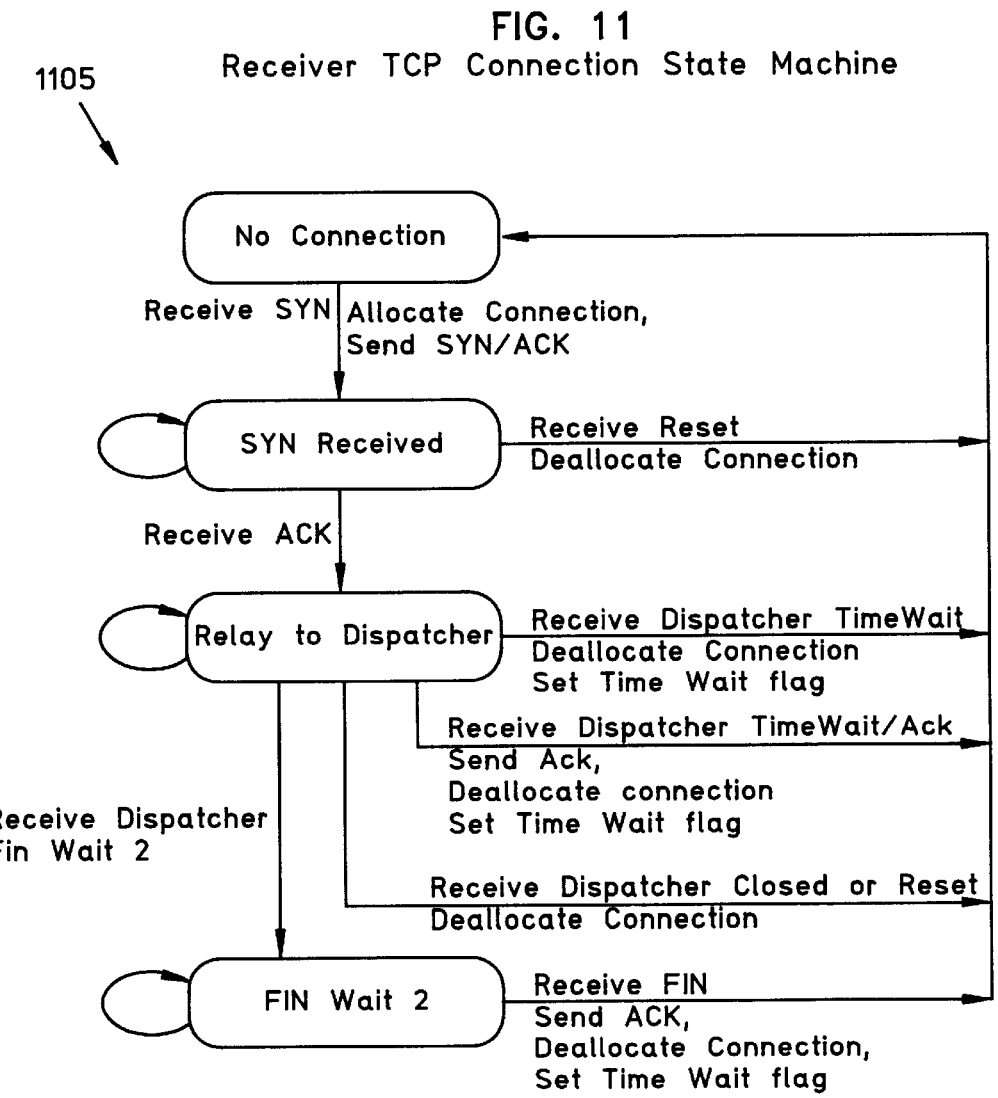

The FIN Wait 2 state can be handled by either the Receiver or the Dispatcher depending on whether or not the application will accept more data after closing its end of the connection.

State transitions occur on receipt of a TCP packet from the client, or (for the Relay state) on receipt of the Dispatcher's reply to the relayed data.

Dispatcher TCP Connection State Machine

Typical Client Request Processing Data Flow

FEDERATED OPERATING SYSTEM FOR A SERVER

BACKGROUND OF THE INVENTION

1. Field of the Invention

The invention relates to a distributed operating system for a digital computer system. More particularly, the invention concerns a high speed server in which different functions of the server's state machine are distributed across a plurality of processors running a plurality of operating systems.

2. Description of the Related Art

The explosion in usage of the World Wide Web over the global Internet has created a corresponding need for servers that have the capability to host large web sites with increased speed and reliability. The Internet employs fiber optic cable and high speed switches and routers to carry all forms of digital content, for example voice, data, and video, across the globe at gigabit data rates (soon to be terabit data rates). On the Internet, the maximum number of users that a server must support is unpredictable and variable, and can range from a handful of users to potentially millions of users, which contrasts with local area networks (LANS) wherein the maximum number of users is relatively small. Consequently, there is a need for servers for use on the Internet that can support a large number of users and that can operate at terabit data rates.

A common solution for operating a large Web site is to construct a server farm. Constructing a server farm entails connecting together multiple servers (perhaps hundreds) with various networking schemes to approximate a single more powerful system. Constructing and operating a server farm is typically an expensive undertaking because server farms require a large amount of space which must be equipped with specialized cooling and power facilities. Additionally, server farms commonly require a staff of engineers to maintain. Server farms generally are complex, and commonly are unreliable due to an excessive amount of downtime. Another shortcoming of server farms is that they cannot provide the power and scalability that is often required by large and growing Web sites.

Symmetric Multi Processing (SMP) servers are a known alternative to server farms. However, the limited scalability of SMP servers generally makes them ill-suited to the needs of large scale Web sites. SMP servers and server farms often cannot handle the high stress, fast growth environment of the Web. For example, secure transactions, which are necessary for e-commerce, are known to frequently bog down SMP servers and server farms.

Computers that are networked over long distances, for example over the Internet, often have protracted response times due to the geographic distance between the client and the server. In order to decrease the time required for a server to respond to requests from clients, Web servers are sometimes replicated at one or more locations which are closer to clients. For example, a client in Japan seeking a connection with a server hosting an e-commerce Web site in Seattle, Wash., might be coupled to a duplicate server in Tokyo rather than the main server in Seattle, Wash. This places the data closer to the user. However, it is difficult to maintain consistency between the data served by duplicate servers, especially if the content is dynamically generated. For example, if a customer uses the on-line ordering capability of one Web server, and later attempts to check the status of an order on a duplicate server, the customer may not get accurate information. When duplicate servers are used, it is also difficult to accurately track hits to a Web site for advertising purposes.

In prior art Internet servers, frequently one machine performs (executes) the entire TCP/IP state diagram, which oftentimes results in sluggishness. In systems in which functions are distributed with clustering software, the distributed functions are typically layered on top of operating systems, for example Linux or Windows NT, which perform generally identical services. Consequently, the computing is distributed at the application level, which frequently results in latencies and other difficulties.

Accordingly, there is a need for a server with increased speed, security, reliability, scalability, capacity, and cost effectiveness, that also has reduced space, power, and cooling requirements, as well as reduced maintenance and operating costs.

SUMMARY OF THE INVENTION

Various aspects of the invention concern a server, methods, and software for implementing a distributed, high capacity, high speed, operating system referred to as the Federated Operating System™ (Federated OS™). ("Federated Operating System™" and "Federated OS™" are trademarks of Thunder River Technologies, Inc.)

One embodiment of the invention concerns a web server that is implemented with a plurality of members which are categorized into member classes. Each member class has a distinct specialized operating system that is optimized for its function. Although each class of operating system is unique, most member classes, or all member classes, have common characteristics inherited from a common parent class. Together, the operating systems of the members make up the Federated Operating System. One illustrative embodiment includes at least one receiver member, at least one dispatcher member, and at least one responder member. Each member has an internal network interface for coupling to an internal network which is used for communications between the members. The internal network can be implemented with, for example, a backplane, a crossbar switch, a LAN, a WAN, or a wireless link (which could include a satellite link). Receiver members and responder members also have an external network interface for coupling to an external network such as the Internet. The external network can also be, for example, a LAN, a WAN, or a wireless network (which could include satellite links).

Receiver members receive requests from clients over the external network, and pass off data from the requests to dispatcher members over the internal network. The dispatcher member that is used for a particular connection uses the internal network to send information to a responder member, instructing the responder member to send data requested by the client to the client over the external network.

Members preferably are implemented with member hardware units that preferably include at least one CPU, RAM, ROM, an internal network interface, and an external network interface. (Alternately, members can be implemented as separate processes or threads on a uniprocessor or SMP (Symmetric Multi Processing) system.) Member hardware units preferably can be reconfigured to operate as any member class, which permits reconfiguring member hardware units during operation of the server for load balancing or to replace defective member hardware units.

Preferred embodiments of the invention use address, port, and host lookup algorithms that execute in a fixed amount of time even when searching databases with a large number of entries. For example, in an HTTP (Hyper Text Transfer Protocol) embodiment, large databases containing IP (Internet Protocol) addresses and TCP (Transmission Control Protocol) port numbers, and large databases containing host names, can be searched in a fixed amount of time. This allows the server to operate in real time even while handling a large number of simultaneous connections.

It is possible to locate different members in the same enclosure, or to separate members over small or large distances. For example, a receiver and dispatcher could be located in Seattle, Wash., while a responder of the same server could be located in Tokyo, Japan, in order to provide fast responses to clients in Japan.

The invention provides its users with a number of advantages such as increased speed, throughput, reliability, scalability, performance, security, and manageability. A server implementing the Federated OS can be scaled up to handle an extremely large volume of Web traffic, including encryption/decryption (for example, secure sockets layer (SSL) transactions used for e-commerce), without performance degradation. Additionally, a server embodying the Federated OS can be implemented in a compact enclosure without special power and cooling requirements, and can be managed and configured from a console by a single technician with minimal training. The invention also provides other advantages and benefits, which are apparent from the following description.

BRIEF DESCRIPTION OF THE DRAWINGS

FIG. 3 is a block diagram of a server implementing the Federated OS in accordance with an illustrative embodiment of the invention.

FIG. 11 is a diagram of a receiver TCP connection state machine, in accordance with an illustrative embodiment of the invention.

DETAILED DESCRIPTION OF THE PREFERRED EMBODIMENTS

Definitions

Figure 1A:
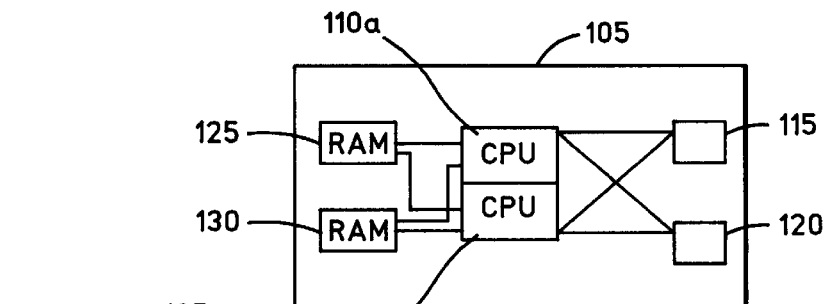
FIG. 1A is a block diagram of a member hardware module in accordance with an illustrative embodiment of the invention.

Distributed: A characteristic of a system whose functionality is split among multiple subsystems, each of which implements a portion of the functionality and which, ideally, can operate simultaneously resulting in faster overall completion of a given task.

Real time: A characteristic of a system that takes no more than a known, fixed amount of time to complete a given task.

Server: A computer system that serves up data and/or receives data and/or processes data.

Client: A device that sends requests and data to servers and receives data in response to those requests. A client can also receive data transmitted from a server that was not sent in response to a request by the client.

VME: Refers to the "VERSAmodule Eurocard" computer architecture developed by Motorola and defined in the original VMEbus specification (IEEE-1014-1987) and later revisions such as VME64 (ANSI/VITA 1-1994), VME64x, and VME320.

Herein the words "preferable" and "preferably" refer to an element, act, structure, material, or characteristic, that is not required, but which is desirable to include.

Herein use of the term "for example" means that the exemplary elements, acts, structure, material, or characteristics which are explicitly stated are not required, and that other elements, acts, structure, material, or characteristics can be used, performed, or included.

Overview of Some Different Aspects of the Invention

The invention, includes, but is not limited to, the following aspects. One aspect of the invention includes embodiments of a digital computer system that implements a Federated Operating System™. Other aspects of the invention include embodiments of a server that implement a Federated Operating System™. Other aspects of the invention include embodiments of a server that implement a distributed TCP/IP state machine. Other aspects of the invention are methods for responding to a request received over an external network. Other aspects of the invention are methods for responding to a request (that does not have to be received over an external network). Other aspects of the invention are methods for initializing a server (or a digital computer system). Other aspects of the invention include embodiments of a signal bearing medium tangibly embodying machine-readable code which is executable by a digital processing apparatus for implementing a distributed server. Other aspects of the invention include embodiments of a signal bearing medium tangibly embodying a program of machine-readable instructions executable by a digital processing apparatus to perform a method for responding to a request. Other aspects of the invention are also described herein.

Overview of the Federated Operating System

The Federated Operating System (OS) is the general architecture of the invention. The Federated OS is a distributed operating system that is implemented with a plurality of members that are categorized into member classes. Each member is an instance of a member class, and can be referred to as a node. Each member class has a distinct specialized operating system (which can also be referred to as an operating system kernel) that is optimized for its function. Together, the operating systems of the members make up the Federated OS. The members of the Federated OS operate together in concert to perform the functions of a server. Thus the system is an integration of multiple operating systems, and is therefore referred to as a federation of members. Each member could operate alone to perform its function, but preferably members of the Federated OS operate cooperatively to implement a server.

The characteristics of the specific operating system implemented by each member are defined by the specific hardware, firmware and/or software combination used to implement that particular member. Thus, the uniqueness of the members is due to hardware, firmware and/or software differences. Although not required, preferably all members (except the configurator member) have common characteristics inherited from a common parent member (using object oriented inheritance). The parent (base) member class from which other member classes preferably are derived contains (among other things) the functionality necessary for synchronous member-to-member communications over an internal network, and preferably also includes an event driven processing loop.

The member classes include, for example, the following classes: receiver, dispatcher, responder, configurator, guardian, persistent storage, system administrator notifier, decoder, routing manager, and bootable, plus proto and external network member classes which are abstract classes. (The term "responder" includes both static responder and dynamic responder classes.) Other classes could also be used. Members of different classes perform different functions. A server implementing a Federated OS preferably includes at least one receiver member, at least one dispatcher member, and at least one responder member (and preferably also includes one or more additional members in other member classes). In an alternative embodiment, a dispatcher member is not included, and the functionality of a dispatcher member is implemented on a receiver member and/or a responder member (or could be implemented on another member, from another member class). Embodiments that are coupled to an external network include at least one member that is coupled to the external network (and preferably include at least one receiver and at least one responder that are coupled to the external network). In embodiments that are not coupled to an external network, a receiver member and/or a responder member need not be included. The number of members in a server, and the classes of the members in a server, are determined by the services that are to be provided by the server, the load on the system, human intervention, and other factors.

Each member includes a hardware and/or software combination that implements an operating system which is different from the operating systems of members in different classes. For example, receiver members implement the same receiver operating system, but dispatcher members implement a dispatcher operating system which is different than the receiver operating system. In the Federated OS, unique characteristics of each member class are implemented at the operating system level. Thus the operating systems for the receiver, dispatcher, responder, and other classes are all different (although preferably they all have common inherited characteristics). This is unlike the prior art, wherein distributed computing often entails clustering software which operates above operating systems which provide essentially identical services. It is possible to subclass new member classes from existing member classes. A new member class would contain all of the functionality of the parent member class plus some new functionality. For example, a dynamic responder can be subclassed from a static responder. As shown in the illustrative embodiment of FIG. 9A, the dynamic responder inherits all of the functionality of the parent static responder, and adds additional functionality related to generating dynamic data. Although not required, preferably the Federated OS is implemented in the C++ programming language, which facilitates implementing the inheritance hierarchy of the operating systems of the members.

The Federated OS is not limited to TCP/IP (Transmission Control Protocol/Internet Protocol) implementations, but rather can implement any network communication protocol, for example Netware, VINES, AppleTalk, DECNET, SNA, OSI, ATM, netBIOS, and IP-over-SONET. Other communication protocols could also be used. Also, the Federated OS can be used both with packet based communication systems, and with circuit based communication systems in which a dedicated circuit is used for the communication. The Federated OS can also be implemented in systems that have no external network, for example, systems that processes data that is received from removable media. For ease of description, but with no limitation intended thereby, TCP/IP embodiments of the Federated OS are often described herein.

Unlike the prior art wherein one machine performs the entire state diagram for the communication protocol suite being used, in the Federated OS, tasks are distributed between the processors in a plurality of members. Thus, in a TCP/IP embodiment of the Federated OS, the TCP/IP state machine is distributed across a plurality of members. In other words, the TCP/IP tasks are split up, and states on TCP/IP state diagrams are mapped to different members. Consequently, the servicing of a single IP address is distributed across the network interfaces of a plurality of members (which can be located either in the same enclosure or in separate enclosures). In embodiments using communication protocols other than TCP/IP, the state machine for those other protocols is also distributed across the members. Thus, response generation and data delivery to one or more clients is processed by multiple members in parallel. In a TCP/IP embodiment, the capability for multiple IP address support is generally limited only by the amount of memory that is available, which permits scaling to support millions or more IP addresses. In a TCP/IP embodiment, the number of simultaneous TCP/IP connections that can be supported is also generally limited only by the amount of memory that is available, which permits scaling to support millions or more of simultaneous TCP/IP connections. Thus, a TCP/IP embodiment can deliver high volumes of data, for example to hundreds of thousands or more, of simultaneously connected Internet users.

With the Federated OS, multithreaded, distributed systems are implemented with multiple, (preferably) single-threaded members. The members of a Federated OS individually typically do not multitask. (However, multitasking by members is possible.) The Federated OS as a whole accomplishes parallel processing because each member functions in parallel with other members. For example, in a TCP/IP embodiment, the Federated OS implements parallel processing of Internet protocols, because each member executes specific aspects of the TCP/IP protocol in parallel with other members. Consequently, the processing of core Internet functions is accelerated. Similarly, in an OSI (Open System Interconnection) embodiment, the Federated OS implements parallel handling of different layers of the Open System Interconnection (OSI) 7 layer stack.

Servers implemented with the Federated OS are well suited for many high performance applications, for example, deploying large-scale Internet/intranet applications such as e-commerce, Web hosting, multimedia delivery (video and audio on demand), specialized military projects, wireless infrastructure, and Internet based games. In addition to use with the Internet, the Federated OS could be used with other types of broadband, packet-based public networks.

Hardware for the Federated Operating System

As mentioned above, the characteristics of the specific operating system implemented by each member are defined by the specific hardware, firmware (for example ROM), and/or software combination used to implement that particular member. Members of the Federated OS are implemented in respective member hardware units (which can be referred to as nodes), which can be implemented in a variety of ways. In some embodiments of the Federated OS, each member (instance) is implemented with a separate hardware module. Thus, in these embodiments each member hardware unit is implemented as a member hardware module. FIG. 1A is a block diagram of an illustrative embodiment of a member hardware module 105. Member hardware module 105 includes at least one CPU 110*a* (central processing unit), an internal network interface 115, an external network interface 120, Random Access Memory (RAM) 125, and a small amount of non-volatile memory (ROM) 130 to store the initial program image that is used to load subsequent instances of a Federated OS kernel. Member hardware units can be implemented with the same or different CPUs, the same or different amounts of memory, and with the same or different types of network interfaces. The internal network interface and the external network interface in member hardware units preferably are both configured for bidirectional communications (inputting and outputting data and other signals). It is not necessary to provide an external network interface 120 for members that will not be used to communicate with the external network, although preferably all member hardware units include an external network interface so that each module has the capability to function as a receiver or responder if necessary. The internal network interface is used for communications between member hardware units over the internal network, and the external network interface is used for communications with clients over the external network. Optionally, the external network interface can also be used for internal communications between member hardware units by providing a communication path in the event of hardware faults or other failures. Although not required, to increase performance, preferably each member maintains internal network messaging information such that each member knows the necessary network routing information used to send messages to other members that the member communicates with.

If a member hardware unit includes more than one CPU, preferably the CPUs of the member hardware unit are interconnected. Although not required, preferably each CPU is coupled to each network interface of the member hardware unit, and the RAM and ROM are coupled to each CPU. Any number of CPUs that can be practicably coupled can be used in a member. For example, each member hardware unit has two CPUs 110*a* and 110*b*.

Preferably, the Federated OS is implemented with portable source code, which permits supporting heterogeneous CPU hardware, thereby allowing the freedom to choose from different processors and different vendors. This portability facilitates optimizing members for specific functionality. For example, an implementation of a member can be optimized to use DSP (Digital Signal Processor) based encryption/decryption engines to support SSL (Secure Sockets Layer) or other secure protocols. Preferably, dependencies on a processor's native byte order, word size, etc., are encapsulated in a minimal code module for each type of processor. Each CPU can be any type of digital processing apparatus, and preferably each CPU is a high speed digital processing apparatus. If a module has more than one CPU, it is not necessary for the CPUs in a module to be the same make or model. Preferably CPU 110*a* is one PowerPC, and CPU 110*b* another PowerPC which is the same as the PowerPC used for CPU 110*a*. Alternatively, the CPUs could be x86 processors, high speed digital signal processors (DSPs) produced by Texas Instruments, or any other processor (which can also be referred to as a digital processing apparatus).

The processors in the Federated OS operate as one integrated computing system made up of a plurality of processors. The number of processors can range from a few processors, to hundreds (or more) of processors, with the number of processors being dependent on the number of members and the number of processors used to implement the members. Processor power can be easily added to a server which implements the Federated OS by adding member hardware units to the system, without the extensive LAN and software configuring that is typically required in prior art Unix or NT server farms.

An exemplary stand alone server implementing the Federated OS in a single enclosure contains a number of rows of member hardware modules and their associated backplane, a network crossbar switch to interconnect the rows of member hardware modules, a network switch coupled to the external network interfaces, interconnects for the network switches, a power conditioning DC power supply, (optional) battery backup with related charging circuitry, and mass data storage. In embodiments in which members are physically separated, the enclosures housing separated members are interconnected via local or long distance network links, which permits the implementation of geographically distributed systems.

Figure 1B:
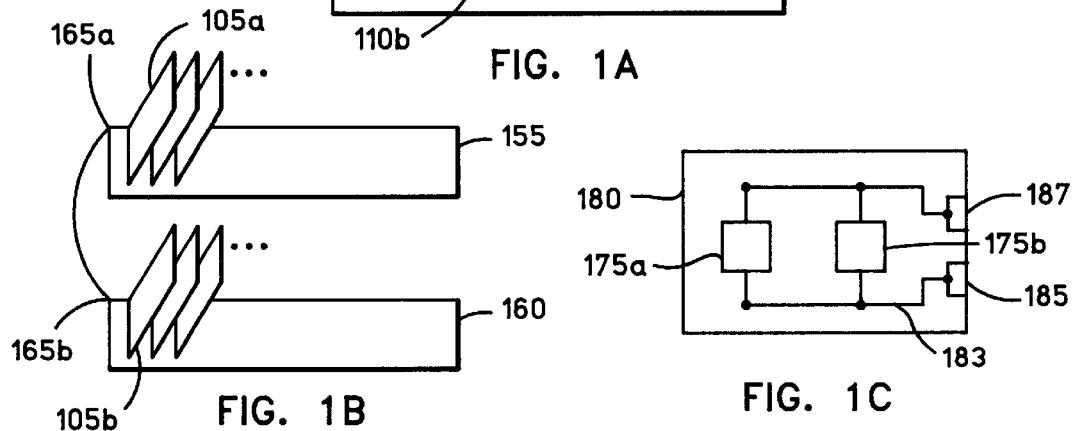
FIG. 1B is a perspective view of member hardware modules and backplanes in accordance with an illustrative embodiment of the invention.

Preferably, the physical packaging of member hardware units and the internal network topology are designed to allow for scalability in terms of the number of member hardware units (and CPUs) supported. For example, in an illustrative embodiment illustrated in FIG. 1B, member hardware modules 105a, 105b, have low power dissipation and are shaped (have a form factor) so that a number of member hardware modules can be installed side by side in a row of typically 10 to 50 modules, and so that several rows can be stacked vertically in a bookshelf-like arrangement. In this embodiment the modules in a given row plug into a backplane (for example backplanes 155 and 160), which provides all of the connections for each module's power and networking interfaces. The backplane also contains the interconnections needed for networking among the modules in a given row, and also provides one or more network connections 165a, 165b, that are used to interconnect with one or more additional rows. The interconnect used in each backplane preferably is a high-bandwidth, low-latency crossbar ("switched fabric") allowing multiple pairs of modules to communicate simultaneously. In implementations using multiple backplanes, the interface between backplanes preferably is a switched fabric similar to that used to interconnect modules.

Member hardware units (and backplanes) can be located physically proximate to each other or may be coupled over large distances. For example, member hardware units can be located in the same enclosure, or in different enclosures in the same building, or can be separated by larger distances, for example one or more kilometers, or even thousands of kilometers. The link coupling a backplane to other modules or backplanes of the internal network can be, for example, fiber optic cable having a length from about a centimeter to many kilometers, and could even extend to opposite ends of the globe. One example of an implementation in which some member hardware units are located remotely relative to other member hardware units is an embodiment where members that are responsible for encryption and decryption of secure messaging are located in a secure physical environment that is remote from other modules of the Federated OS. Preferably the Federated OS is implemented with a large number (hundreds) of CPUs in a compact enclosure.

Figure 1C:
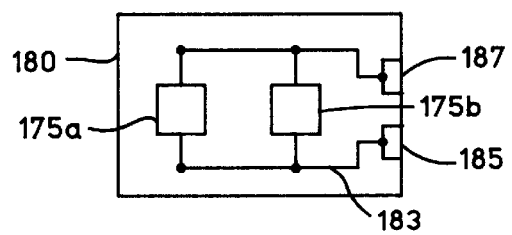
FIG. 1C is a top view of ICs and a circuit board in accordance with illustrative embodiments of the invention.

In another embodiment, referred to as a "system on a chip" embodiment illustrated in FIG. 1C, the CPU(s), network interfaces, RAM, and ROM, of a member hardware unit are integrated into a single integrated circuit (IC). In this embodiment one or more ICs 175a, 175b, which contain those elements, and internal network interconnect hardware, are mounted on a single circuit board 180. In this embodiment preferably the circuit board is made in the same physical shape as the member hardware modules discussed above, and can be plugged into the same backplane. In the system on a chip embodiment, the internal network 183 interconnects all of the CPUs on the board. Circuit board internal network interface 185, and circuit board external network interface 187 are provided for connecting off the board. In a variation of this embodiment, one or more of the ICs each contain multiple member hardware units (CPU/network interface/RAM/ROM combinations), which are interconnected within each IC, and which also interface off the chip to the internal network on the board, and to the external network. Thus, multiple member hardware units are implemented in a single IC. Also, subsystems can be implemented on a single chip which includes multiple processor modules and a network switch.

Internal Network and External Network

Figure 2:
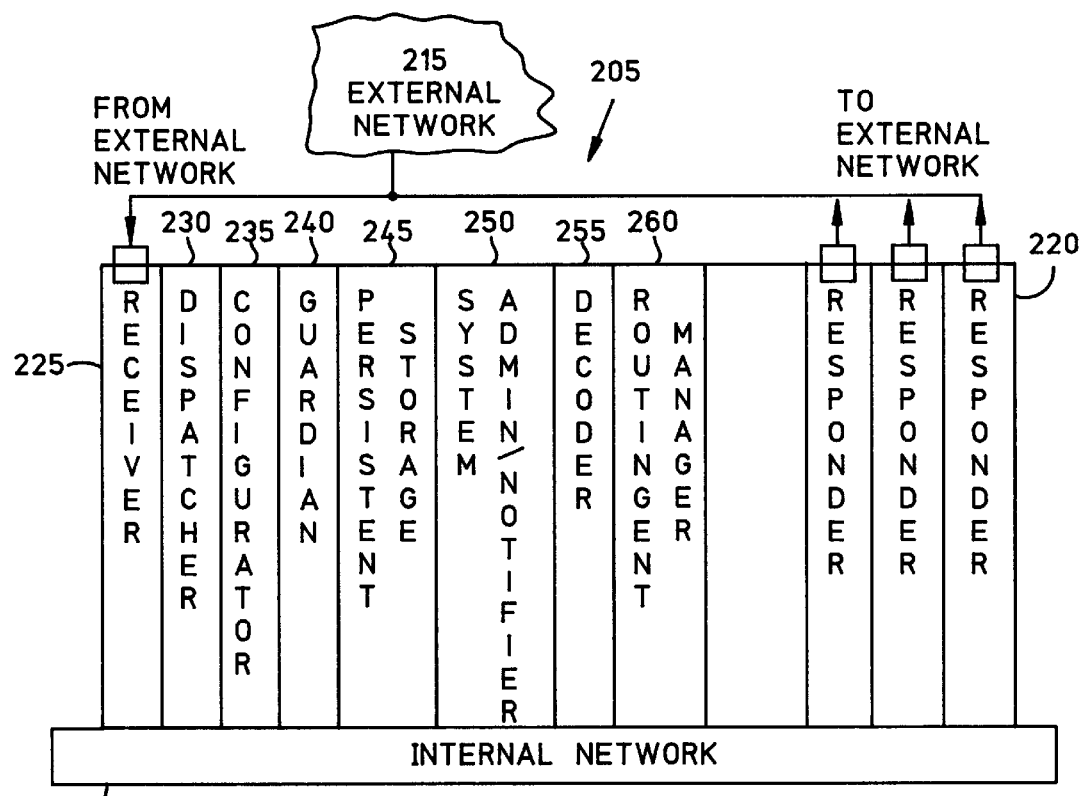
FIG. 2 is a block diagram of a server implementing the Federated OS in its operative environment, in accordance with an illustrative embodiment of the invention.

As discussed above, the Federated OS includes a plurality of members. As illustrated in FIG. 2, the members of the Federated OS 205 communicate with each other over an internal network 210, which can be, for example, a backplane, a crossbar switch network, a local area network (LAN), a wide area network (WAN), or any other suitable type of wireline or wireless network. Preferably, the internal network has high bandwidth and low latency. Optionally, the internal network can be made up of a plurality of networks which are integrated, for example, in a backplane. Examples of implementations of the internal network include: a backplane such as VME64 or CompactPCI, crossbar switch networks such as Race++, SCI (Scalable Coherent interface), and Myrinet, proprietary custom network interfaces, LANs such as Ethernet, and WANs such as SONET or ATM. The WAN can use any type of high speed transmission system. Preferably, the internal network is implemented with SCI, which is a high performance, packet communication and switching technology. Other possibilities are fibrechannel and skychannel, or any other way of establishing communication between the members. The internal network could also be adapted for use with emerging interconnection standards such as InfiniBand. The internal network interface 115 (FIG. 1) of each member is coupled to the internal network. Consequently, all of the members are coupled to the internal network and can communicate with each other over the internal network.

In some alternative embodiments of a server implementing the Federated OS, there is no connection to an external network. For example, a computational engine server that receives data from removable media, or via physical sensors, chemical sensors, optical sensors, and/or audio sensors need not be coupled to an external network. Preferably, at least one receiver 225 and one responder 220 are coupled to an external network 215. The internal network interface 115 of each member hardware module 105 is for coupling to the internal network 210, and the external network interface 120 of each member hardware module 105 is for coupling to the external network 215. As mentioned above, it is not necessary for members that are not coupled to the external network to have an external network interface, although preferably all members do have an external network interface. The members that are coupled to the external network can be coupled with, for example, Ethernet connections, or ATM. The external network can be any type of LAN and/or WAN, and can be any type of wireline or wireless network. Although the Federated OS is optimized for large external networks such as the Internet, it could also be used with smaller WANs or LANs.

Although in FIG. 2 all of the members that are coupled to the external network are coupled to the same place in the external network, this is not required. In other words, members may be coupled to the external network at different locations in the external network. Also, the external network interface of one or more of the members may be coupled to the Internet by direct connection to the Internet backbone, which is accomplished by connecting the respective network interface directly to one or more of the main providers of the Internet backbone.

Real Time, Distributed, and Object Oriented

Federated OS members (preferably) are real time because each (preferably) runs as a single task that can be preempted only by a fixed number of interrupts, which each have known, bounded, execution times. The Federated OS as a whole (preferably) is real time because the service and protocol algorithms (preferably) are all executed in real time. For example, in a TCP/IP embodiment, the receiver member process preferably receives TCP/IP packets in real time. As a further example, in a TCP/IP embodiment, IP address lookups and host name lookups are preferably accomplished in real time.

The Federated OS is distributed because operating system services (such as the TCP/IP protocols in a TCP/IP embodiment) are distributed across the member operating systems (which are coupled on the internal network), and because the Federated OS supports distributing functionality among different members.

The Federated OS is (preferably) object oriented because, (1) members (preferably) are derived from and inherit behavior from a parent class, and the members expand on what is inherited; and (2) because (preferably), the system is built with object oriented tools.

Real Time Address lookup and Host Lookup

In a TCP/IP embodiment, for HTTP (Hyper Text Transfer Protocol), a client sends a packet of information containing an IP address, a port number, and a host name to the server to define the service provided by the server that the client desires to access. It is possible to have multiple host names supported at the same IP address, and conversely, it is possible to have multiple IP addresses that correspond with a single host name. The IP address relates to Internet protocol (IP), the port relates to transmission control protocol (TCP), and the host name relates to Hyper Text Transfer Protocol (HTTP).

Generally, in servers known in the art, operating systems and/or applications must search for matches to the IP addresses, TCP port numbers, and other data such as host names in incoming messages. IP addresses and host names in incoming messages are compared to (possibly) numerous IP addresses and (possibly) numerous host names stored in respective databases that are accessible to the server. Typically the networking code of the operating system is responsible for processing the IP address and TCP port number of an incoming packet in order to determine if the packet belongs to a new or existing connection, and to determine the appropriate application to send the data to. Other data in the message (for example, a host name) may need to be searched by the application (for example, an HTTP Web server) in order to process the incoming packet.

TCP/IP embodiments of the Federated OS (preferably) use the "Trie" data structure in its search algorithms in order to quickly and deterministically search for a match among a large number of IP addresses, and among a large number of host names. An algorithm using the "Trie" data structure generally requires the same amount of search time regardless of the size of the database to be searched. This type of algorithm is referred to as being deterministic because the search time for each type of search is constant and does not depend on the size of the pool to be searched. In contrast, prior art servers typically use algorithms (for example, hash tables) that approximate deterministic performance only if the size of the pool to be searched is small enough. This approach is used in the prior art in order to minimize the amount of memory required to maintain the data structures required by the search algorithm, and is based on an assumption that only a limited number of simultaneous sessions need to be supported. The search time required for prior art search methods generally increases if additional addresses are added to the database, and consequently prior art systems generally cannot be operated in real time. In contrast, wherever possible the Federated OS uses algorithms using the Trie data structure, which have execution times that are not affected by the number of data structures to be searched. As a result of using deterministic search algorithms, the Federated OS requires a constant amount of time to process each incoming packet, even when supporting a large number of sessions. Use of the deterministic algorithms allows the Federated OS to operate in real time, because all searches are completed in the same fixed short amount of time, and because the fixed amount of time is short enough to allow the system to be operated in real time. In a TCP/IP embodiment, it can be said that the Federated OS has a real time TCP/IP state machine. A real time state machine could also be implemented in non TCP/IP embodiments of the Federated OS. Although using deterministic algorithms significantly improves performance and is preferred, use of deterministic search algorithms in the Federated OS is not required.

In a preferred TCP/IP embodiment, the Federated OS can support millions of simultaneous TCP/IP connections, and can host at least hundreds of thousands of IP addresses and hundreds of thousands of host names with no performance degradation. This is due to the design approach and the algorithms used, and is a result of the ability to process an incoming packet in a known amount of time regardless of how many other active connections-are being maintained. Prior art TCP/IP servers, on the other hand, frequently experience significant performance degradation or even failure when attempting to maintain a large number of connections, or when attempting to support a large number of IP addresses, even when the majority of those connections are idle.

Event/Network Driven

Although not required, preferably the Federated OS is event driven/network driven. In other words, the network protocol functionality is active and invokes the appropriate service only when there is data to be acted upon. (In a TCP/IP embodiment, an example of an event is receipt of a TCP/IP packet resulting from a user clicking on a hyperlink on a Web page). In contrast, in conventional servers, applications drive the protocol stack, such that applications read data from the network and block until the data is available.

Multiple External Networks

Although not required, the Federated OS can be coupled to more than one external network. For example, a receiver and responder of a server implementing the Federated OS can be coupled to a first external network, and another receiver and another responder of the server can be coupled to another external network. A server implementing the Federated OS, which is coupled to more than one external network, can be configured to prevent data transfer between different external networks, or can be configured to implement a routing function to pass any data between any two external networks, or can be configured to implement a firewall by selectively passing data between two external networks. Routing can be implemented with a routing manager member (for example the routing manager member 920 shown in FIG. 9A). Similarly, a firewall manager member (for example the firewall manager member 928 shown in FIG. 9A) can be used to selectively pass permitted data from one external network to another external network.

Security Features

The Federated OS has a number of features that enhance security. For example, clients are connected to the external network but are not connected to the internal network, and the external network is used only to transfer data to and from clients. "Denial of Service" attacks are mitigated by the members' capabilities to process incoming packets at network speed (in preferred embodiments). Preferably all client data is passed via safe container objects, and bounds checking is enforced, thereby mitigating buffer overflow attacks. Also, encryption/decryption can be delegated to members geographically separated in physically secure locations. Firewall protection can be easily realized, for example to provide security in systems coupled to multiple external networks.

Member Classes

As mentioned above, each member class has a distinct specialized operating system that is optimized for its specific function. For example, each receiver member has a receiver operating system, each dispatcher member has a dispatcher operating system, and each responder member has a responder operating system. Different member classes are different unique subclasses of the parent class, which is referred to as the proto class. An exception is the configurator class, which may or may not be a subclass of the proto class. Examples of member classes are receiver 225, dispatcher 230, responder 220, configurator 235, guardian 240, persistent storage 245, system administrator-notifier 250, decoder 255, and routing manager 260 classes (illustrated in FIG. 2), in addition to the bootable class. Additionally, there are proto member and external network member classes, which are abstract classes that are not implemented as members, but which are parent classes for members. One illustrative embodiment of a server implementing the Federated OS includes one receiver member, one dispatcher member, and eight responder members (and preferably also includes a guardian member). The Federated OS is scalable in the sense that members can be added or removed as desired. It is possible to include a large number of responders, for example 400 responders, and even greater numbers of responders could be used. If each responder transmits data at, for example, 2.5 gigabits per second, and if there are, for example, 400 responders, then the Federated OS would have a capability of delivering one terabit ($2^{40}$ bits per second) of data. Each responder could be coupled, for example, to an OC-48 connection to transmit data at 2.5 gigabits per second.

Although not required, preferably, every member hardware unit has the capability to be dynamically reconfigured during operation ("on the fly") to perform the function of any non abstract member. In other words, the CPU(s) of a member preferably can be dynamically assigned any of the member functions. For example, if a dispatcher becomes inoperable, a responder or receiver, for example, could be dynamically reconfigured during operation of a server to function as a dispatcher. This capability also permits dynamic load balancing. Dynamically reconfiguring member hardware units permits fault recovery without loss of service. Thus, a server implementing the Federated OS is a fault tolerant distributed system that can reallocate services away from failed member hardware units (or failed member ICs).

Preferably, all members are derived from a bootable member which preferably is derived from a proto member. Alternatively, members can be implemented without being derived from another member, in which case such members must implement intermember communication functionality.

Member classes are described as follows:

Receiver Member

Preferably, one or more receivers are included in the Federated OS.

Although described in this section in terms of "the receiver", there can be more than one receiver.

Preferably, the receiver is derived from an external network member.

In embodiments that include a receiver, the receiver is coupled to an external network.

The receiver handles client connection management. For example, in response to connection requests from clients, the receiver establishes connections between clients and the server. For example, in TCP/IP embodiments, the receiver establishes TCP connections with clients. Establishing a connection usually does not involve transfer of client data.

The receiver preferably is the only network interface of a particular server that a remote client can transmit to.

The receiver can receive or transmit data over the external network, but in TCP/IP embodiments the receiver generally only transmits header data, for example, a handshake to establish a connection.

In embodiments which include a receiver and a dispatcher, once a connection is established between a client and the server, and data is received, the receiver hands off the data to a dispatcher. For example, in a TCP/IP embodiment, the data could be a HTTP request.

In TCP/IP embodiments, the receiver processes IP and TCP, and preferably also processes ARP (Address Resolution Protocol) and ICMP (Internet Control Message Protocol).

In a TCP/IP embodiment, although not required, the receiver preferably has only a partial TCP/IP state machine.

In TCP/IP embodiments, the receiver preferably manages IP fragment reassembly.

In TCP/IP embodiments, the receiver preferably maintains some TCP state information.

Dispatcher Member

Preferably, one or more dispatchers are included in the Federated OS.

Although described in this section in terms of "the dispatcher" there can be more than one dispatcher.

Dispatchers need not be coupled to the external network, which enhances security.

The dispatcher preferably manages resource allocation, for example determining which responder(s) to assign to respond to each client request. The data required to respond to a request can be spread across more than one responder.

In a TCP/IP embodiment, the dispatcher preferably performs active connection management, and service management including for example HTTP session management, mail session management, and FTP.

In a TCP/IP embodiment, the dispatcher processes connections which are in states which allow data transfer to occur. The dispatcher preferably maintains a record of the state of each connection that the dispatcher is processing. The state information includes items required by the TCP specification (for example, sequence numbers) as well as information required by the Federated OS (for example, which responder and response identifier is associated with a given connection.) For example, a connection is associated with a particular service, and the service code associates a response object with the connection. The response identifier is state information that is saved in the dispatcher which identifies the response object, and is, for example an integer that serves as an index that the dispatcher hands off to a responder which allows the responder to identify the correct response information. Other state information regarding connections is preferably maintained by other members.

Responder Member

Preferably, one or more responders are included in the Federated OS. Although sometimes described in this section in terms of "the responder" there can be more than one responder, and preferably there are many responders in a server.

Preferably, the responder is derived from an external network member.

In embodiments that include a responder, the responder is coupled to an external network.

The responder transmits data.

The responder preferably can manage and transmit static data, and/or create, manage, and transmit dynamic data.

The responder performs the function of sending requested data to a specific client.

In a TCP/IP embodiment, the responder transmits HTTP data, mail data, and/or data for other services.

Although not required, preferably at least one member of the Federated OS includes a non real time layer. For example, a responder can include a non real time layer for running non real time programs (for example Java). Preferably the non real time layer is Linux. Alternatively, the non real time layer could be an open source non real time layer such as FreeBSD, or OpenBSD or a non open source non real time layer such as AIX or Solaris, or any other open source or non open source non real time layer. The Federated OS can be used to implement an operational server even if there is no interface to a non real time layer, but in that case the server cannot run non real time programs. The non real time layer, for example Linux, runs as a task on a member of the Federated OS.

Preferably, there are two main behaviors of a responder: (1) transmit static data cached in the responder and/or load static data onto the responder; (2) service dynamic data requests, for example, by generating response(s) with an application running on a Java virtual machine running in the non real time layer of the responder.

In a TCP/IP embodiment, preferably, responders are divided into two groups which include (1) static responder members, and (2) dynamic responder members. Static responder members, for example, manage and transmit static data for HTTP, FTP, mail, and other services.

Dynamic data can be created by any member of the Federated OS, in either the real time layer or the non real time layer. For example, a dynamic responder member can request data from a persistent storage member (for example persistent storage member 475 in FIG. 4B) and optionally combine that data with other data (for example an HTTP header) and transmit the combined data to the client. In another example, a dynamic responder member can request data from an external database server (for example, external database server 485 in FIG. 4B), and optionally combine that data with other data and transmit the combined data to the client. It is not necessary for a dynamic responder to have a non real time layer. If a dynamic responder has a non real time layer, then the dynamic responder implements non real time layer scheduling, and a non real time layer messaging interface (for example to Linux or Solaris). Dynamic responder members transmit dynamic data to the client. Preferably dynamic responder members are derived from a static responder member.

Configurator Member

A configurator is not required in embodiments of the Federated OS that are preconfigured.

Although described in this section in terms of "the configurator" there can be more than one configurator in a server. However, preferably there is only one configurator in a server.

The configurator has a user interface for loading, modifying and saving the overall system configuration. Preferably, the configurator also allows the user to query the system for its current configuration, and to monitor its operation. Preferably, the configurator is language encoding neutral, and numerous languages (for example, English, Japanese, German, etc.) are fully supported in the user interface. Preferably the user interface is a graphical user interface, which is used in conjunction with a monitor, mouse, and keyboard.

As shown in FIG. 3, one illustrative embodiment of a server 300 implementing the Federated OS includes a server housing 305 which includes the member hardware units and the internal network (for example the member hardware modules and internal network shown in FIG. 2). The server is coupled to the external network at one or more locations. This illustrative embodiment of the server preferably also includes a monitor 310, a mouse 315, and a keyboard 320, which are coupled to a configurator member.

In the HTTP service of a TCP/IP embodiment, the system configuration includes items such as the IP addresses and TCP ports on which to listen. The configurator provides a centralized configuration of the entire system, which in a TCP/IP embodiment preferably includes all core Internet services, such as for example, an HTTP service, an FTP service, an IMAP email service, and a POP3 email service.

When configuring the system, the configurator transmits code to other members, or informs other members of the location of code, which the other members run in order to become instances of specific classes of members required for a given configuration. This code can be stored in a ROM, a persistent storage member, or in another storage device.

The configurator member does not have to be a subclass of the proto member, because it is not necessary for the configurator member to participate in the real-time operation of the server. Preferably, the configurator is not a subclass of the proto member, and is not a real time member. If the configurator is not implemented as a subclass of the proto member, the configurator member must still implement the same messaging protocol as the proto member, so that the configurator member will be able to communicate with the real time members. The configurator may be implemented, for example, as a standard process on a non real-time operating system (for example, MacOS or Linux), along with the device drivers needed to communicate with the server's internal network.

Guardian Member

One or more guardian members may optionally be included in the Federated OS.

Although described in this section in terms of "the guardian", there can be more than one guardian.

The guardian member monitors the health of the system by receiving periodic status messages from the other members, as well as by initiating periodic queries to the other members. Accordingly, the guardian receives data periodically, for example, once per second (or any other period of time), from members over the internal network. Preferably, the guardian monitors both hardware and software. The system can be configured so that one or more guardians monitor one or more other guardians.

Through the guardian(s), the server is able to detect malfunctioning member(s) and dynamically reconfigure the system on the fly by assigning another member hardware unit to perform the function of each respective malfunctioning member. The guardian can accomplish this by loading the data that the failed member was responsible for, onto the hardware unit of another member of the same class as the failed member, and then informing members of the change. For example, the response data of a failed responder is loaded onto another responder, and affected dispatcher(s) are informed of the new location of the affected responses. If there are no other members of the same class as a failed member, or if the existing members are unable to accept the relocated functionality, the class of an existing member may be changed to the class of the failed member by restarting the existing member hardware unit (which may require relocating that member's functionality to the hardware unit(s) of yet another member(s). Thus, the architecture is self monitoring and self healing.

If a CPU fails, the failure is detected by a guardian and the failed member's tasks are transparently reallocated to another processor in another member, and an alert for other members is posted on the internal network. If a CPU in a member has not failed, but if an internal communication channel in the member is unavailable due to hardware or software failure, preferably the failed member automatically reroutes messages with no service loss. If this is not possible, the failure will be detected by the guardian and recovery proceeds as for the case of a CPU failure.

Load balancing: The architecture of the Federated OS inherently implements load balancing, because the load is inherently distributed across the members. For example, in a TCP/IP embodiment, the TCP/IP state machine is distributed across a plurality of members. Preferably, the Federated OS also includes intelligent load balancing for dynamically assigning resources to match changing user demand. Dynamic load balancing can be accomplished, for example, by having a dispatcher assign tasks to the responder that the dispatcher determines is most lightly loaded. Alternatively, or in addition to dynamic load balancing controlled by dispatchers, dynamic load balancing can be accomplished by having responders determine when they are underutilized. When a dispatcher and/or responder(s) determine that one or more responders are lightly loaded, the functionality of two or more responders can be consolidated on a smaller number of responders (in a manner similar to that used for recovering from a failed member). The class of the resulting unused member(s) can be changed by restarting the unused member(s) as members of member classes that are experiencing a greater load, for example, receivers. Static load balancing can be simply implemented by dividing the data among the responders. Another approach for load balancing is a geographic algorithm, in which the responder that is geographically closest to the requesting client is selected. Yet another approach for load balancing is a network topology algorithm in which the responder that is closest to the client in terms of network topology is selected. The responders loads can also be distributed based on the capabilities of each responder. For example, responses requiring encryption capabilities are assigned to responders that have encryption capabilities. Load balancing can be automated, or can require human intervention.

Persistent Storage Member

One or more persistent storage members may optionally be included in the Federated OS. Persistent storage members are unique with respect to the other member classes in that they have a direct interface to one or more data storage devices. Consequently, hardware used to implement a persistent storage member must have an interface for coupling to one or more data storage devices. Persistent storage members are responsible for serving raw data to and from the other members. This permits the processors of the members to share a large amount of storage, preferably terabytes of high speed (gigabit/second) redundant Fiber Channel RAID (Redundant Array of Independent Disks) storage. Any other type and size of storage could also be used, for example, conventional hard drives, optical discs, ROM, etc. Optionally, a persistent storage member may include a large amount of high speed RAM, which is used to cache data in a memory resident database. Optionally, the persistent storage member may emulate a file system.

System Administrator Notifier Member

One or more system administrator notifier members may optionally be included in the Federated OS. In the event of a disruption, such as a power or telephone service outage, event-based remote alerts notify the system administrator personnel, for example by pager or cell phone. The system administrator notifier either detects the disruption itself or is informed of the disruption by another member, and then the system administrator notifier attempts to contact the system administrator personnel to notify them of the disruption. Optionally, the functionality of a system administrator notifier member can be included in a guardian member.

Decoder Member

One or more decoders may optionally be included in the Federated OS.

A decoder is a member specifically optimized to handle encryption/decryption or authentication functions, for example, in TCP/IP embodiments, SSL (Secure Sockets Layer) session management. An illustrative embodiment of a decoder member includes a large number of specialized CPUs (for example RISC processors, or digital signal processors), with each CPU simultaneously handling the computation intensive aspects of encryption/decryption for a given connection.

Routing Manager Member

One or more routing managers may optionally be included in the Federated OS. A routing manager maintains address routing tables. For example, in a TCP/IP embodiment, a routing manager member maintains IP routing tables.

Firewall Manager Member

One or more firewall manager members may optionally be included in the Federated OS. A firewall manager member determines which data is to be passed from one external network to another.

Proto Member

The proto member is the parent class of the other real time member classes. Preferably, all real time member classes inherit the properties of the proto member. (As mentioned above, the configurator member, need not be a subclass of the proto member.)

The proto member class is an abstract class, which means that there is not a member instance created that is only a proto member, but rather, each real time member preferably is an instance of one of the subclasses derived from the proto member class.

The proto member functionality includes, for example, memory management, self health monitoring, member to member communications, and utility functions. Self health monitoring means that the member has the ability to measure its performance and load, and to determine its "health" by determining the state of the hardware, firmware, and software components that comprise the member. The proto member can include a capability to determine when there is a problem with a member and then request help, and/or can include the capability to share data with other member(s) that analyze the data and determine whether there is a problem. Member to member communications functionality is functionality for sending and responding to messages from other members. For example, a proto member includes functionality for responding to a message from a configurator informing the member which class of member that it will be, for example, a receiver. The proto member preferably also includes functionality for receiving and loading code implementing the designated member class assigned to a member. In other words, preferably every member (except perhaps the configurator member) has the ability to receive a message, which is itself a new instance of the operating system. For example, the contents of the message could be the operating system code to transform a bootable member into, for example, a receiver. As discussed above, a member can subsequently be transformed into another class of member, for example, a dispatcher.

External Network Member

Figure 9A:
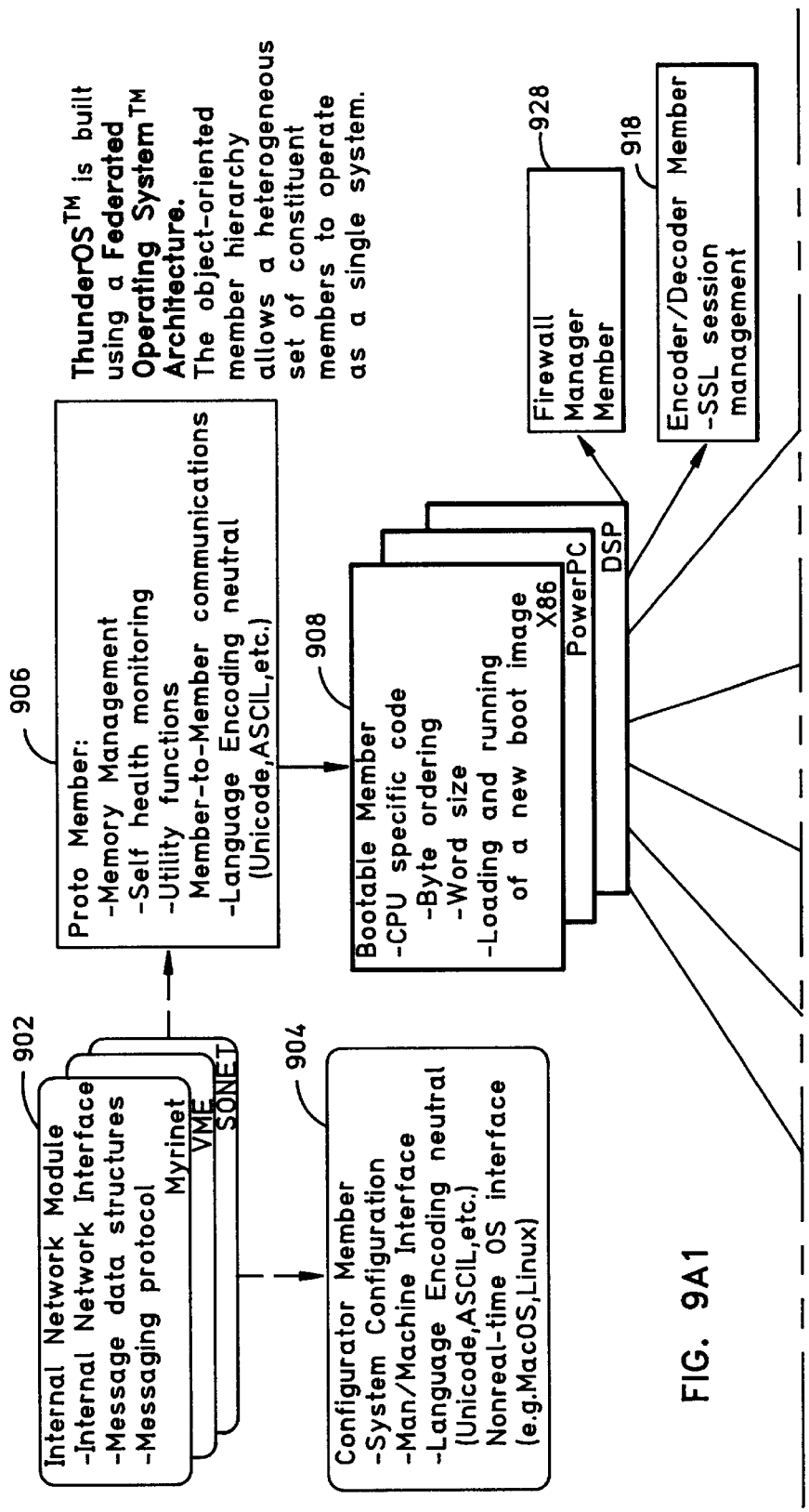
FIG. 9A is a block diagram illustrating the relationships between members of ThunderOS, in accordance with an illustrative embodiment of the invention.

The external network member preferably is a subclass of a bootable member, and preferably is the parent class of receiver and responder members. An example of an external network member 916 is shown in FIG. 9A. Receiver and responder members preferably inherit properties from the external network member, such as external network interfacing capability, and raw protocol support. An example of raw protocol support in a TCP/IP embodiment is parsing and generation of IP and TCP packets. The external network member class preferably is an abstract class, which means that there is not a member instance created that is only an external network member, but rather, each receiver and responder member preferably is an instance of a subclass derived from the external network member class. There is possibly a different external network member used for each external network interface, for example Myrinet, Ethernet, and ATM. Alternatively, there is a single external network member that support a plurality of external network interfaces.

Bootable Member

Bootable members are a subclass of the proto member. Thus, bootable members inherit the functionality of the proto member. Bootable members, however, must define CPU specific code necessary to implement that functionality. A bootable member is a bare bones instance of a Federated OS real-time member. Because bootable members have CPU specific code, bootable members are not necessarily identical. Thus, bootable members for X86, PowerPC, and DSP processors are different from each other. CPU specific code can include, for example, specific byte ordering and word size. Typically, the executable code for a bootable member is part of the firmware (non volatile memory) of a member (node), so that when power is supplied to the member, the member becomes an instance of a bootable member.

Each member class (except possibly the configurator class and the proto class) preferably is a child class of a bootable member. Bootable members have the ability to receive and load the executable code to implement a designated member class assigned to a member. In other words, every bootable member, or subclass of a bootable member, has the ability to receive a message which contains a new instance of an operating system. For example, the message could contain the operating system code to transform a bootable member into, for example, a receiver. As discussed above, a member can subsequently be transformed into another class of member.

Figure 4A:
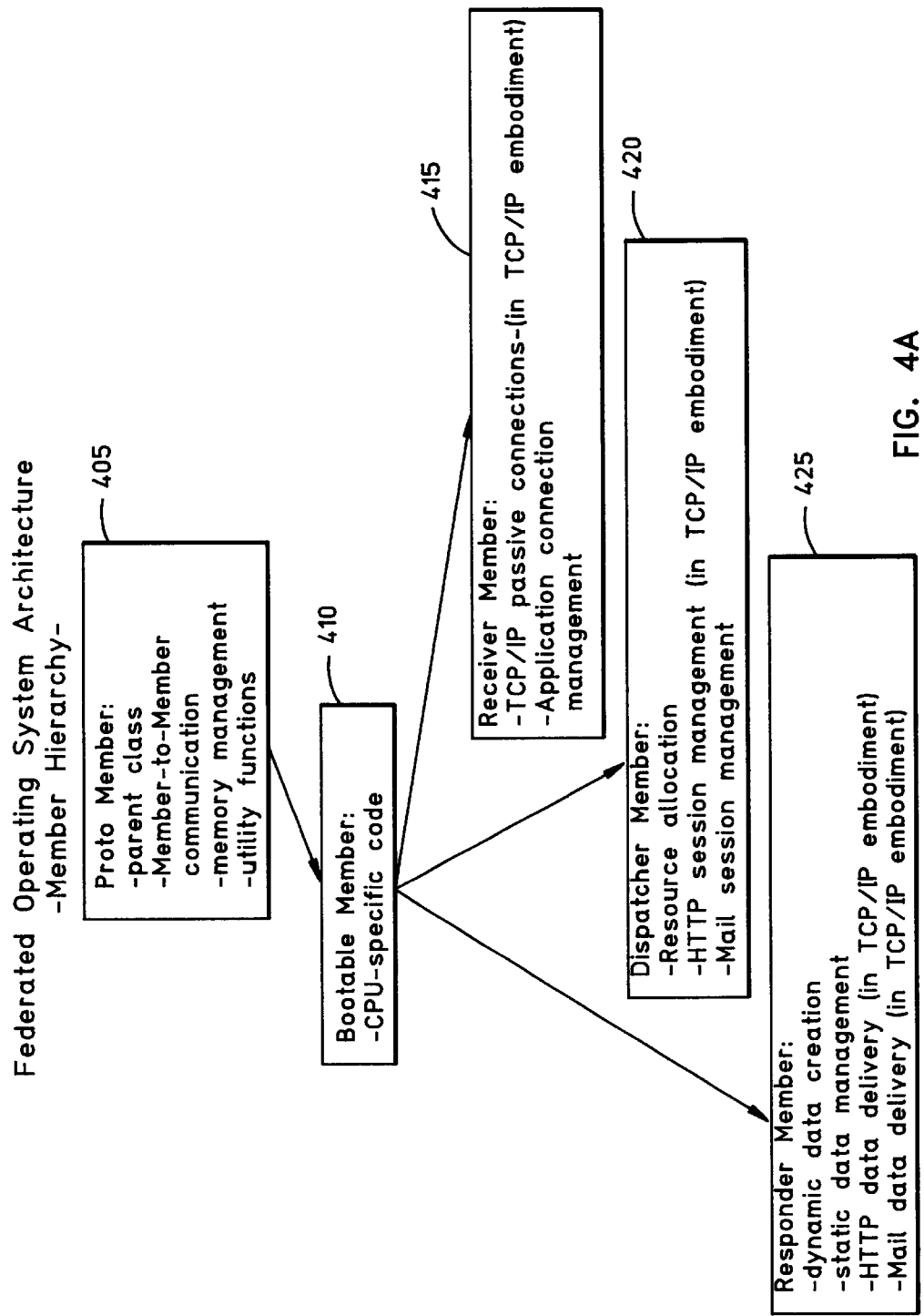
FIG. 4A is a diagram illustrating the relationships between some members of the Federated OS in accordance with an illustrative embodiment of the invention.
Figure 4B:
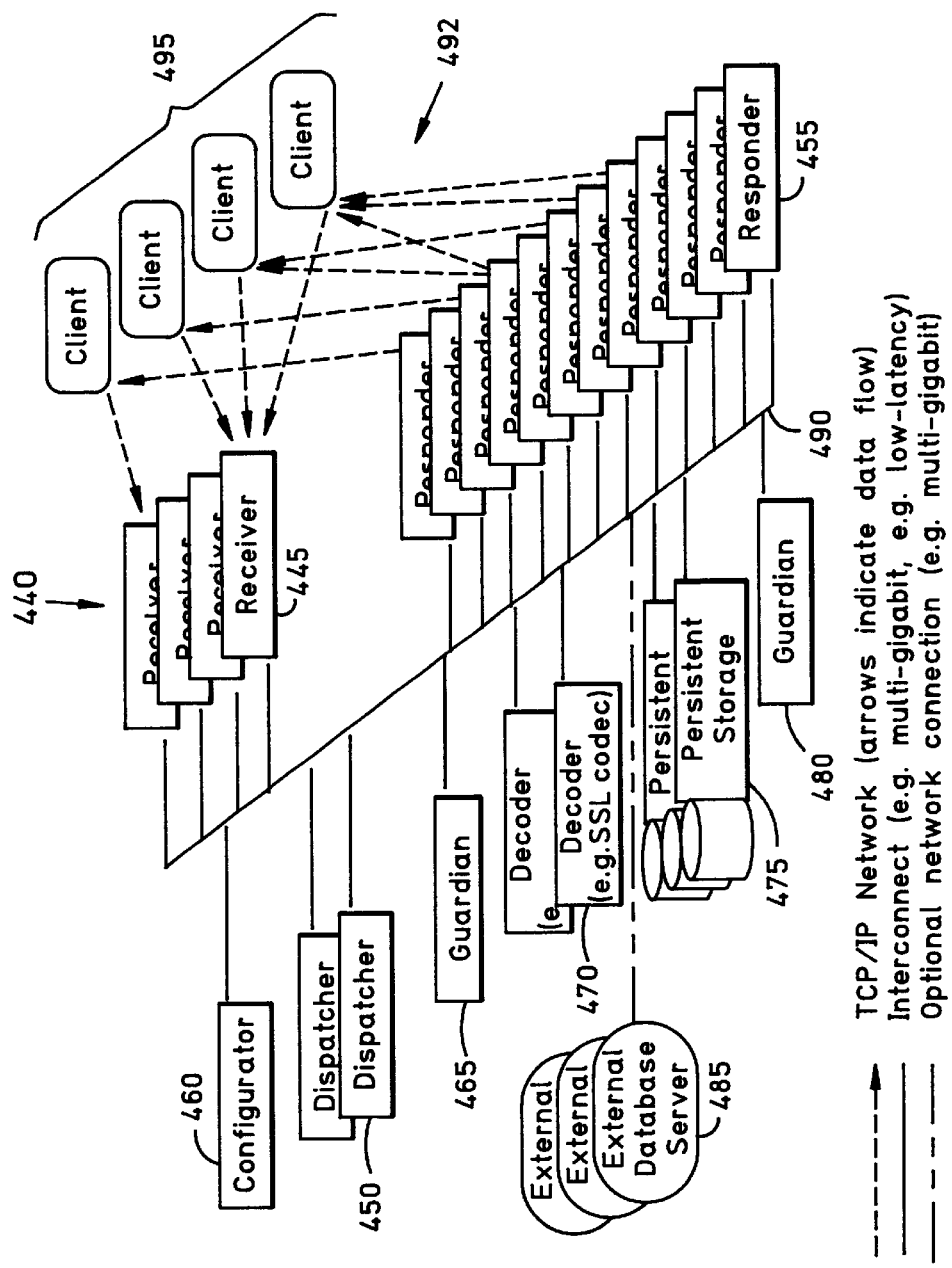
FIG. 4B is a block diagram of components of a server implementing a Federated OS in its operative environment in accordance with an illustrative embodiment of the invention.

FIG. 4A illustrates the hierarchial relationship between a proto member 405, a bootable member 410, a receiver member 415, a dispatcher member 420, and a responder member 425 in an illustrative embodiment of the Federated OS. FIG. 4A illustrates that bootable members preferably are instances of the proto member, and that member classes operating as nodes of the Federated OS preferably are instances of a bootable member (although the bootable members need not be identical). FIG. 4B is a block diagram of a server 440 in its operative environment, implementing an illustrative embodiment of a Federated OS. FIG. 4B illustrates receivers 445, dispatchers 450, responders 455, configurator 460, guardian 465, decoders 470, persistent storage members (data servers) 475, guardian 480, external database server 485, internal network 490, external network 492, and clients 495. The external database servers shown in FIG. 4B are conventional servers that optionally can be coupled to the internal network of a server implementing the Federated OS.

Internal Network Module

Preferably the proto member and the configurator member include an internal network module (for example the internal network module 902 shown in FIG. 9A). The internal network module includes for example, an internal network interface, message data structures, and messaging protocol, which are used to facilitate communications over the internal network. Internal network modules are specific to a particular internal network protocol. For example, depending on the protocol used on the internal network, one of the following internal network modules is used: a switched fabric crossbar, for example Myrinet, a bussed backplane, for example VME, or a WAN, for example SONET. The internal network module is not a member class.

Embodiment with Geographic Dispersion of Members

In one embodiment of the Federated OS, at least one member is located at a different location than other members. This is possible because with the Federated OS, it is not necessary for the members (or processors) to be physically close or contiguous. Members do not have to be located in the same enclosure, in the same room, or even on the same continent. In other words, members can be separated and can be located anywhere as long as they can communicate with each other over an internal network. For example, the internal network can be implemented with a WAN using a SONET transmission system, rather than with a VMEbus backplane. (Transmission systems other than SONET could also be used.) This could be useful, for example, to locate one or more responders in a different location than the remainder of the Federated OS. For example, a responder could be located in Tokyo in order to locate data close to clients in Japan, to enable quick servicing of requests from clients located in Japan, while the receiver and dispatcher remain housed at a main location in Seattle, Wash. Even though the data can be located remotely from other members of the Federated OS, only one session per client is required for this embodiment, as in other embodiments. Thus, in this embodiment a responder can be located near clients without the need to replicate entire servers, and without the undesirable consequences of replicating servers, such as generating excessive traffic, and difficulty in tracking the number of hits to a site.

In another implementation of this geographically dispersed members embodiment, numerous responders of the same Federated OS can be located at various locations throughout the world. For example, one or more receivers and dispatchers, and preferably other members, could be housed at a main facility at, for example, Seattle Wash., while one or more responders are, located at, for example, New York, London, Berlin, Hong Kong, and Tokyo. It would be possible to locate a large number of responders, for example hundreds (or more), which are all members of a single Federated OS, at various locations throughout the world. Responders could also be located on satellites.

Figure 5:
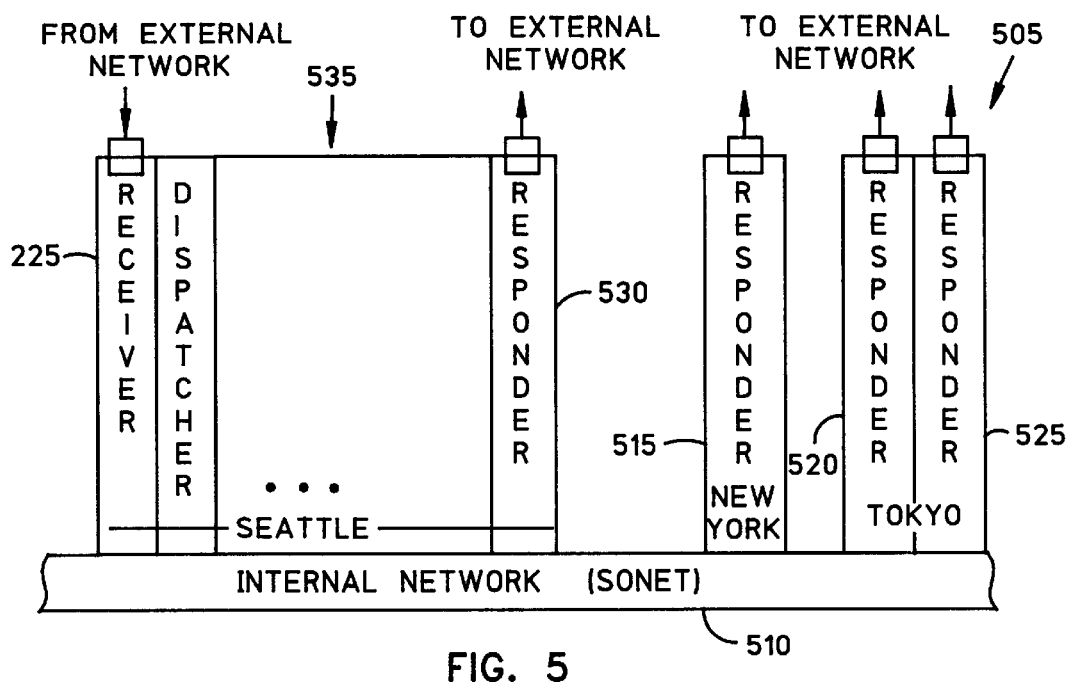
FIG. 5 is a block diagram of a server in its operative environment in which members are geographically dispersed, in accordance with an illustrative embodiment of the invention.

FIG. 5 illustrates a server 505 implementing a geographically dispersed members embodiment, using a SONET transmission system for the internal network 510, in which one responder 515 is located in New York, two responders 520, 525 are located in Tokyo, and in which one responder 530 and the remainder of the members 535 are located in Seattle. Locating a responder in Seattle is not required.

In the embodiments in which members are geographically dispersed, any of the members can be located remotely from any of the other members, as long as the members are able to communicate with each other over an internal network. Thus, this embodiment is not limited to locating only responders remotely from other members. For example, a receiver, or a receiver and a responder, could be located remotely from the remainder of the members of a Federated OS. The geographic dispersion embodiment is of particular interest for Internet applications, which preferably are implemented with a ThunderOS embodiment of the Federated OS.

Embodiment with Direct Internet Backbone Connection

Figure 6:
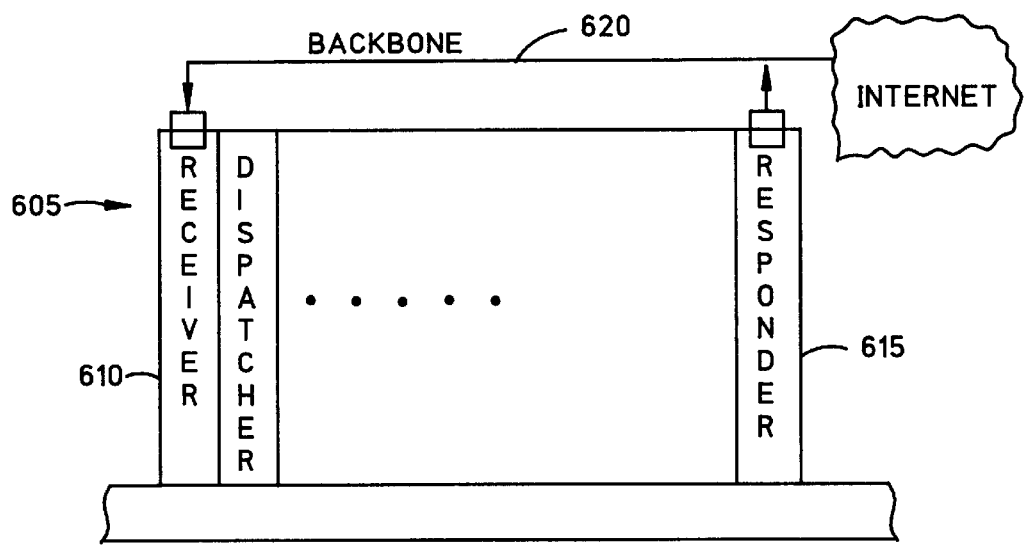
FIG. 6 is a block diagram of a server in its operative environment in which some members are coupled directly to the Internet backbone, in accordance with an illustrative embodiment of the invention.

A server 605 in accordance with another embodiment of the invention is illustrated in FIG. 6. In this embodiment, one or more receivers 610 and responders 615 are coupled directly to the Internet backbone 620 (the external network). This reduces the number of hops, thereby increasing speed.

Embodiment with Direct Internet Backbone Connection and Remote Datastore

Figure 7:
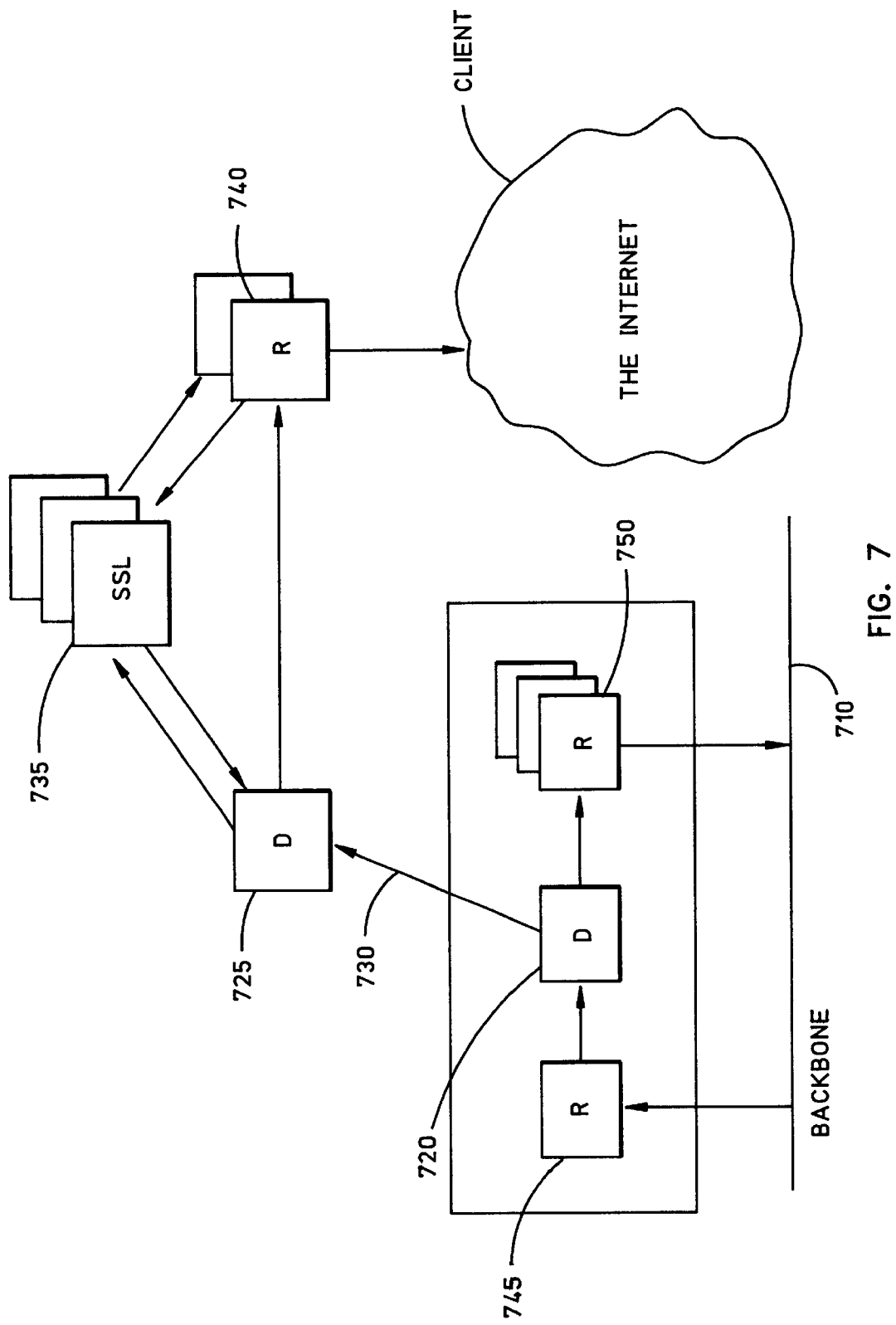
FIG. 7 is a block diagram of a server with a remote datastore, in its operative environment, in which some members are coupled directly to the Internet backbone, in accordance with an illustrative embodiment of the invention.

In another embodiment illustrated in FIG. 7, one or more receivers and responders are coupled directly to the Internet backbone 710 (external network) as in the preceding embodiment. In this embodiment a dispatcher 720 is coupled to a dispatcher 725 over a secure private connection 730. Dispatcher 725 is coupled to one or more decoders 735 (which both encrypt and decode) implementing SSL (Secure Sockets Layer) and to one or more responders 740. Responders 740 are coupled to the external network. Responders 740 are also coupled to decoders 735. Dispatcher 725, decoders 735, and responders 740 are located at a secure site (which typically is geographically remote from receiver 745, dispatcher 720, and responders 750), for example in a bank or a corporation that desires to maintain control of the data on the responders 740. This embodiment could be used, for example, by a corporation or bank that desires to make data available over the Internet, while leaving the datastore under the control of the corporation or bank, and while maintaining extremely high speed for the receiver and responders that are coupled directly to the backbone. In this embodiment, a client sends an encrypted message to the receiver 745, which is transferred from the receiver to dispatcher 720, and which is then sent from dispatcher 720 to dispatcher 725 over private connection 730. Dispatcher 725 then sends the message to one of decoders 735 which decodes the message and returns the decoded message to dispatcher 725. Dispatcher 725 then sends a message identifying the location of the requested data to one of responders 740, which sends the data to one of decoders 735 where the data is encrypted and then returned to the one of the responders 740, which then sends the encrypted data to client over the Internet.

Asymmetrical and Symmetrical Embodiments

Some embodiments of the invention may be referred to as being asymmetrical. A Web server implementation of the invention is one example of an embodiment that typically will be asymmetrical. These embodiments are referred to as being asymmetrical because the amount of data received by the server is usually much smaller than the amount of data that is output by the server. (However, it is possible that the data flow could be asymmetrical in the other direction, where the amount of data received by the server is larger than the amount of data that is output by the server, for example, in a mail server that receives a lot of mail that is not retrieved.) Other embodiments of the invention may be referred to as being symmetrical. A mail server (from which the mail is regularly retrieved) is an example of an embodiment that typically will be symmetrical. Another example of an embodiment that is typically symmetrical is a telephony embodiment, wherein IP packets carry voice data. These embodiments are referred to as being symmetrical because the amount of data received by the server is roughly similar to the amount of data that is output by the server. It is possible for an implementation of the invention to have both asymmetric and symmetric characteristics. For example, a server could function as a typical Internet data server, and could also function as a mail server and/or a voice data server.

Thunder Operating System™ (ThunderOS™)

("Thunder Operating System™" and "ThunderOS™" are trademarks of Thunder River Technologies, Inc.)

ThunderOS, which is one of many possible embodiments of the Federated OS, is a specific instance of the Federated OS which is optimized for Internet servers, and which is the preferred embodiment-of the Federated OS. ThunderOS is a distributed, scalable TCP/IP implementation of the Federated OS. In the Thunder OS embodiment of the Federated OS (which can include various embodiments of ThunderOS), the members run operating systems which together make up ThunderOS. As in the Federated OS in general, with ThunderOS each member class runs a unique operating system. ThunderOS includes a distributed TCP/IP state machine. ThunderOS incorporates TCP/IP and Internet server software which is highly optimized for the Internet. Preferably Thunder OS is implemented in the C++ programming language, which facilitates implementing the inheritance heirarchy of the operating systems of the members.

For increased speed, ThunderOS is implemented such that key Internet services and protocols are implemented directly as part of the distributed operating system.

These Key Internet Software Services and Protocols Include:

HTTP (Hyper Text Transfer Protocol);
    FTP (File Transfer Protocol);
    IMAP (Internet Messaging Access Protocol); and
    POP3 (Post Office Protocol 3).

In addition to these key Internet software services and protocols, other lower level network protocols typically found in operating systems such as TCP/IP, DNS (Domain Name Server), ARP (Address Resolution Protocol), UDP (User Datagram Protocol), and ICMP (Internet Control Message Protocol), are preferably also included in Thunder OS. ThunderOS preferably also includes WAP (Wireless Application Protocol), SSL (Secure Sockets Layer), and other services and protocols. These services and protocols are implemented in a distributed manner, utilizing multiple member classes to distribute the processing involved. In ThunderOS implementations of these services and protocols execute in realtime with respect to incoming network packets. This means that incoming packets are each processed in a bounded amount of time regardless of the number of active connections a server is maintaining. Synchronous messaging is used to enforce realtime deadlines, and a realtime TCP/IP state machine is implemented with constant-time algorithms.

Figure 8:
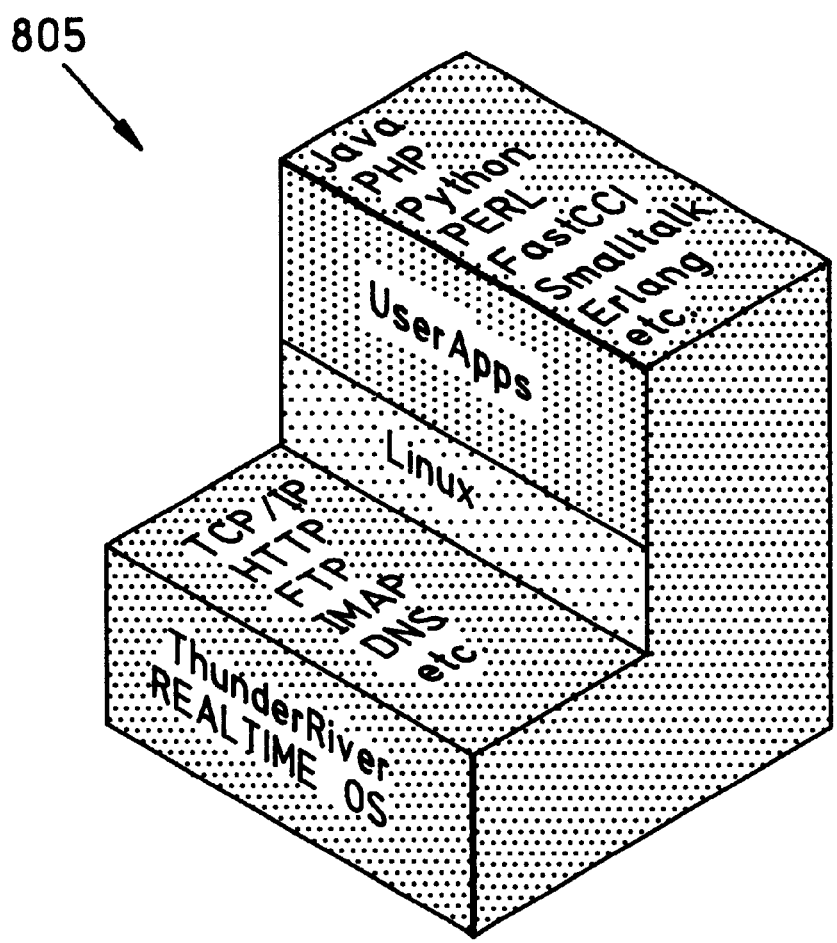
FIG. 8 is a diagram of components of the Federated OS, including ThunderOS, in accordance with an illustrative embodiment of the invention.

An illustrative embodiment of ThunderOS 805 illustrated in FIG. 8 includes TCP/IP (Transmission control Protocol/Internet Protocol), HTTP (Hyper Text Transfer Protocol), FTP (File Transfer Protocol), IMAP (Internet Messaging Access Protocol), DNS (Domain Name Service), etc.

As illustrated in FIG. 8, in the ThunderOS embodiment of the Federated OS, the Federated OS preferably runs a non real time layer on designated processors or members, to support tools for generating dynamic content such as, for example, Java, Python, PERL, FastCGI, CGI, Smalltalk, PHP, Erlang, C++, and others. Consequently, optional end user applications written for these languages or environments can run on the non real time layer. ThunderOS members are implemented as single threaded, real time processes, with optional support for interfacing to the non-real time system which is allowed to run when the real time process is idle. The non real time layer can support multitasking, with multiple processes or threads of execution. Preferably the non real time layer is a Linux kernel, although other non real time systems could be supported. Operating the Linux layer above ThunderOS ensures that existing Linux applications can run "as is". With ThunderOS managing Internet services in real-time and Linux providing standards-based open interfaces, a server implemented with this embodiment of the Federated OS provides a powerful platform for hosting large, dynamic Web sites.

Dynamic content can be generated in the real time layer, or by applications that run in the non real time layer. For example, for a non real time layer, a Java virtual machine is provided for Java applications, and a Perl interpreter is provided to run applications written in Perl. These applications create dynamic data in response to a request, but do not need visibility into how that data is delivered back to the requesting client.

Figure 9B:
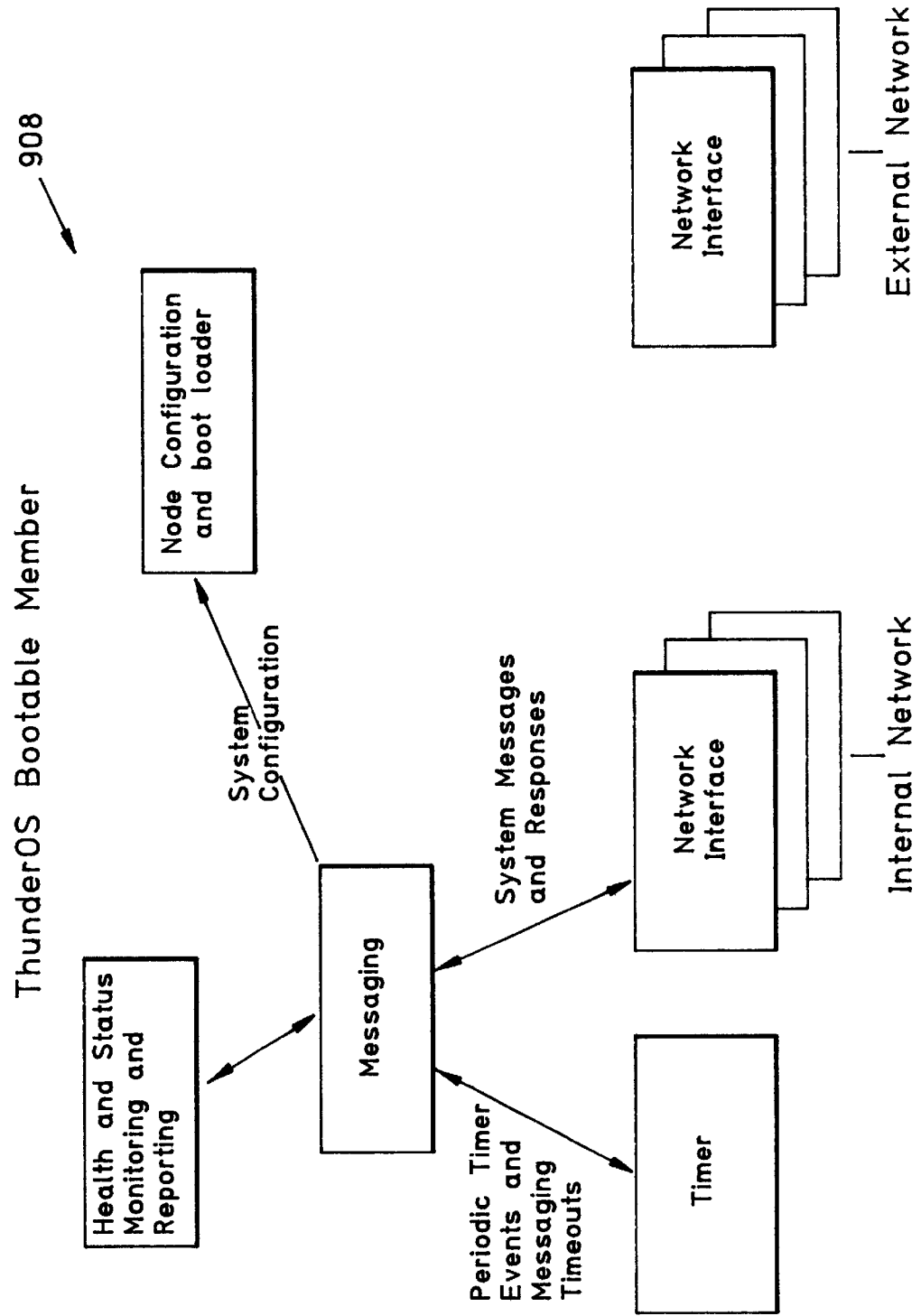
FIG. 9B is a block diagram illustrating functions and interactions in a bootable member in ThunderOS, in accordance with an illustrative embodiment of the invention.
Figure 9C:
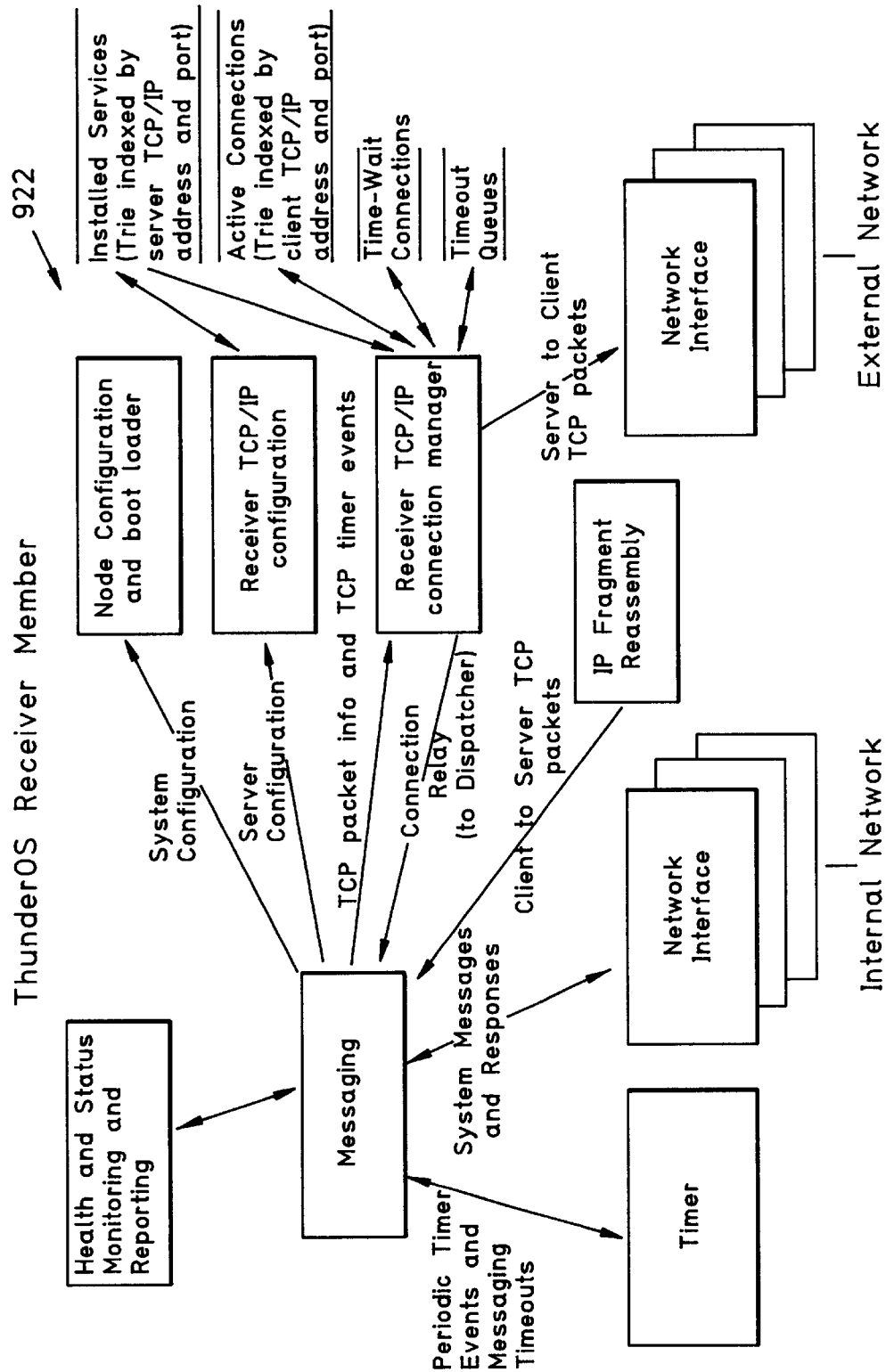
FIG. 9C is a block diagram illustrating functions and interactions in a receiver member in ThunderOS, in accordance with an illustrative embodiment of the invention.
Figure 9D:
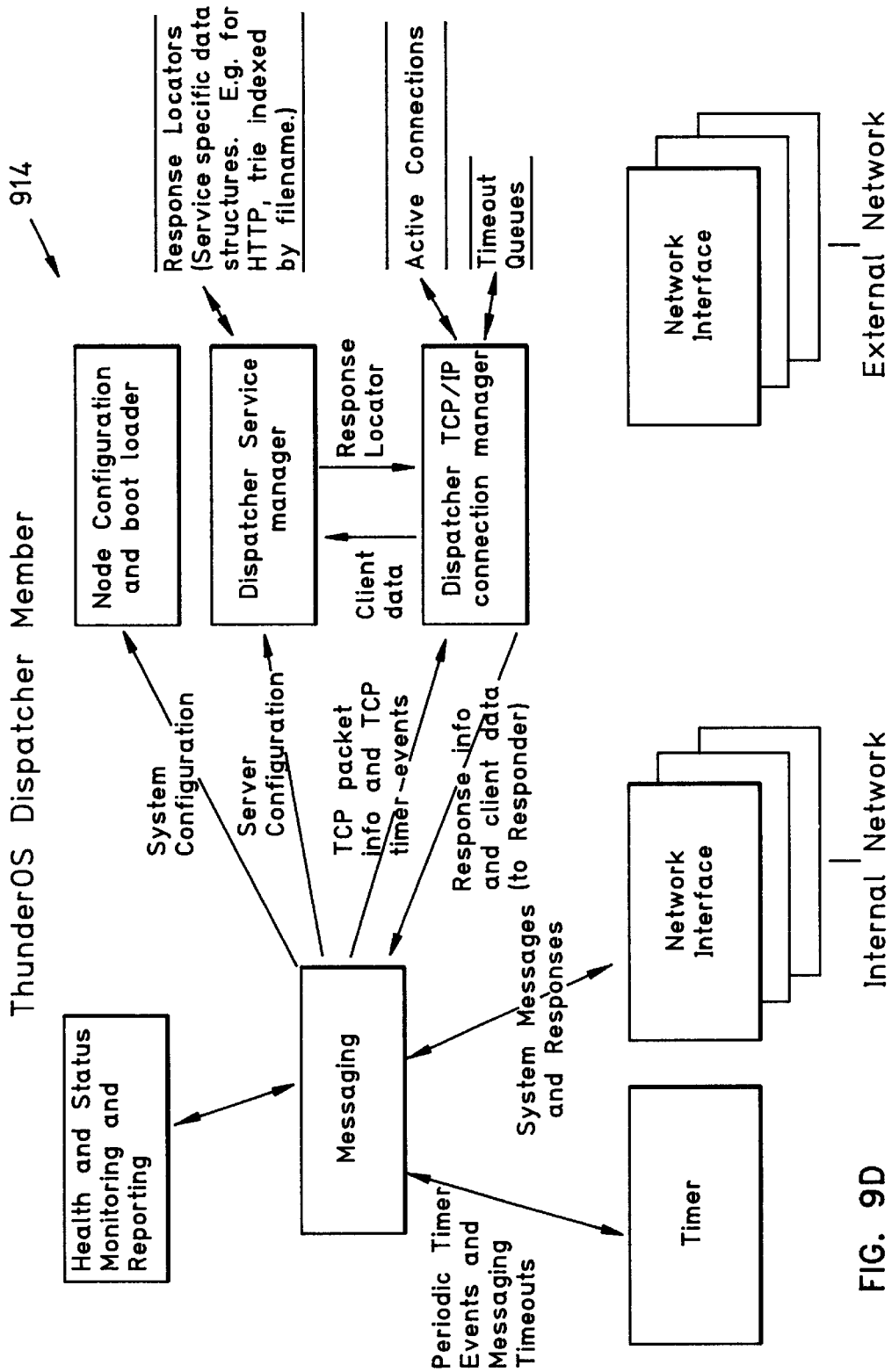
FIG. 9D is a block diagram illustrating functions and interactions in a dispatcher member in ThunderOS, in accordance with an illustrative embodiment of the invention.
Figure 9E:
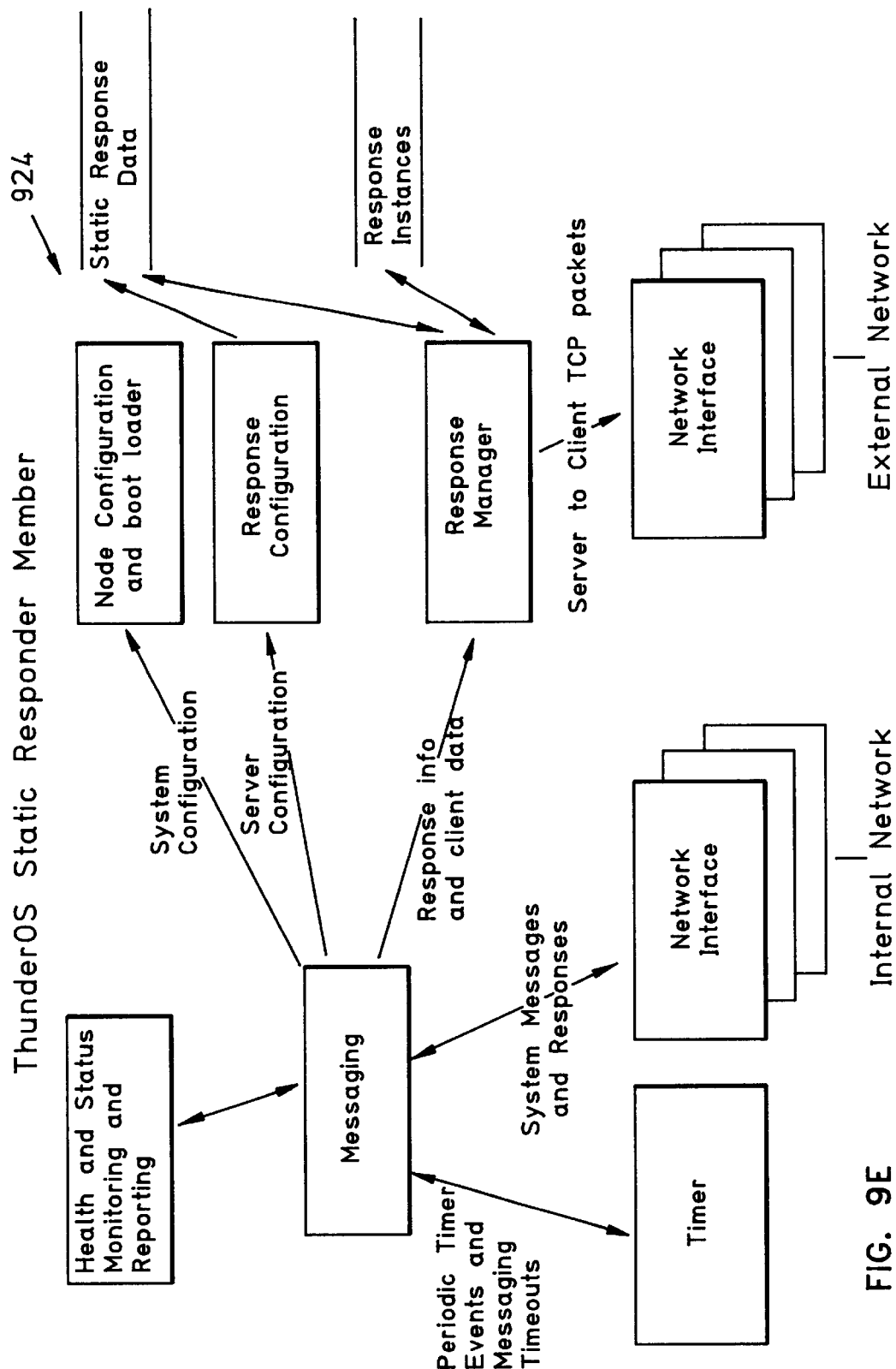
FIG. 9E is a block diagram illustrating functions and interactions in a static responder member in ThunderOS, in accordance with an illustrative embodiment of the invention.
Figure 9F:
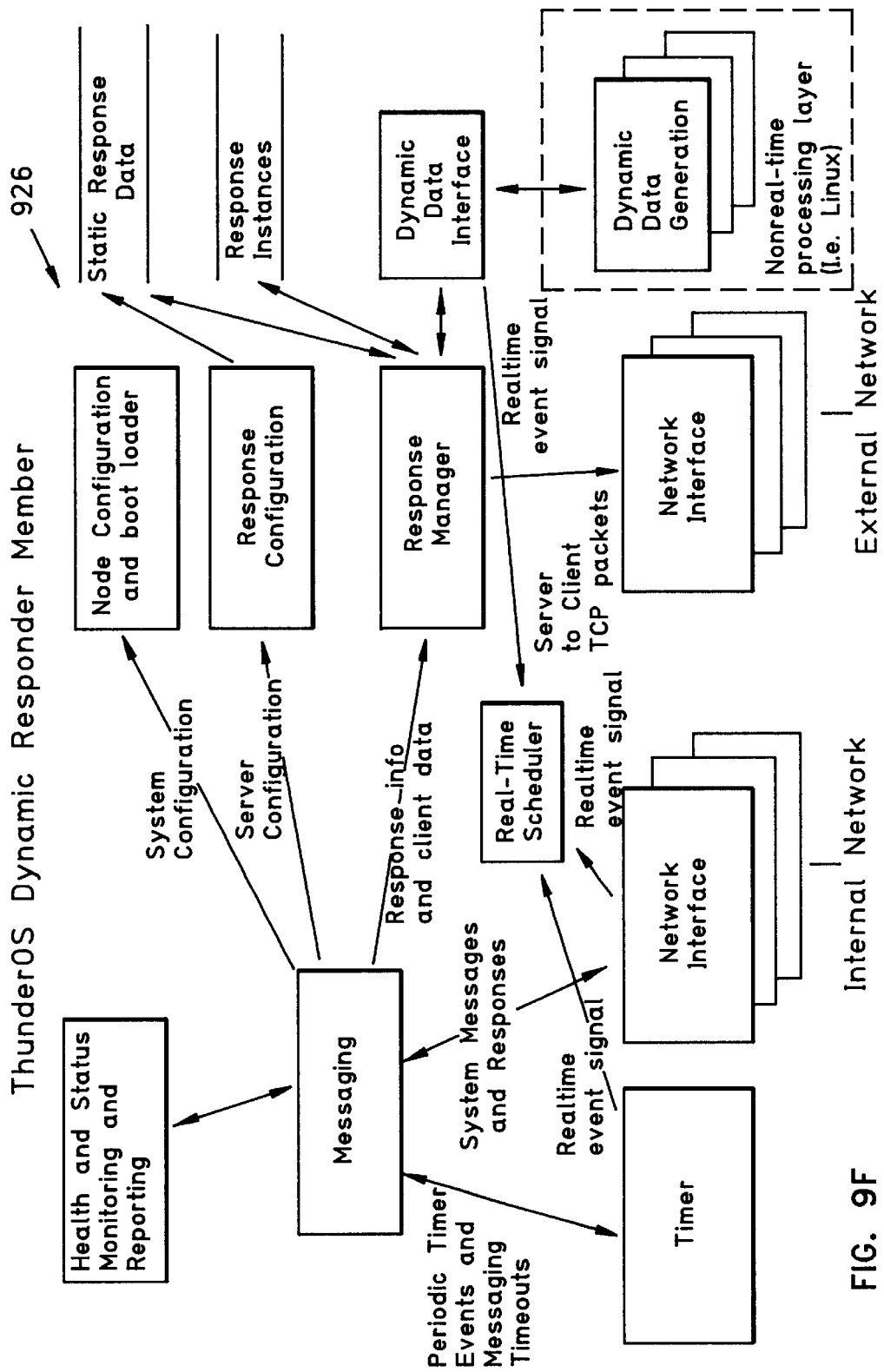
FIG. 9F is a block diagram illustrating functions and interactions in a dynamic responder member in ThunderOS, in accordance with an illustrative embodiment of the invention.

FIG. 9A is a block diagram illustrating the relationships between members of ThunderOS. FIG. 9A includes internal network modules 902, configurator member 904, proto member 906, bootable member 908, persistent storage member 910, guardian member 912, dispatcher member 914, external network member 916, encoder/decoder member 918 (also referred to as a decoder member), routing manager 920, receiver member 922, static responder member 924, dynamic responder member 926, and firewall manager member 928. Thunder OS is implemented to be language encoding neutral, as indicated in the configurator member 904 and proto member 906 boxes in FIG. 9A, which means that a wide variety of languages are supported in addition to English. FIG. 9B is a block diagram illustrating functions and interactions in a bootable member 908 in ThunderOS. FIG. 9C is a block diagram illustrating functions and interactions in a receiver member 922 in ThunderOS. FIG. 9D is a block diagram illustrating functions and interactions in a dispatcher member 914 in ThunderOS. FIG. 9E is a block diagram illustrating functions and interactions in a static responder member 924 in ThunderOS. FIG. 9F is a block diagram illustrating functions and interactions in a dynamic responder member 926 in ThunderOS. In ThunderOS, responder members are either static responder members or dynamic responder members.

TCP as implemented in ThunderOS (referred to as ThunderTCP), utilizes the distributed nature of the Federated OS to enhance the servicing of TCP connections. The TCP specification (Internet Requests for Comments (RFC) 793, which is incorporated herein by reference) describes a state machine with eleven states. However, only a few of these states are involved in the actual data transfer. The nature of these states causes TCP to lend itself to a distributed implementation such as in ThunderOS. A server implemented with ThunderOS is implemented as a distributed state machine which uses connection objects to hold the necessary state information.

Figure 10:
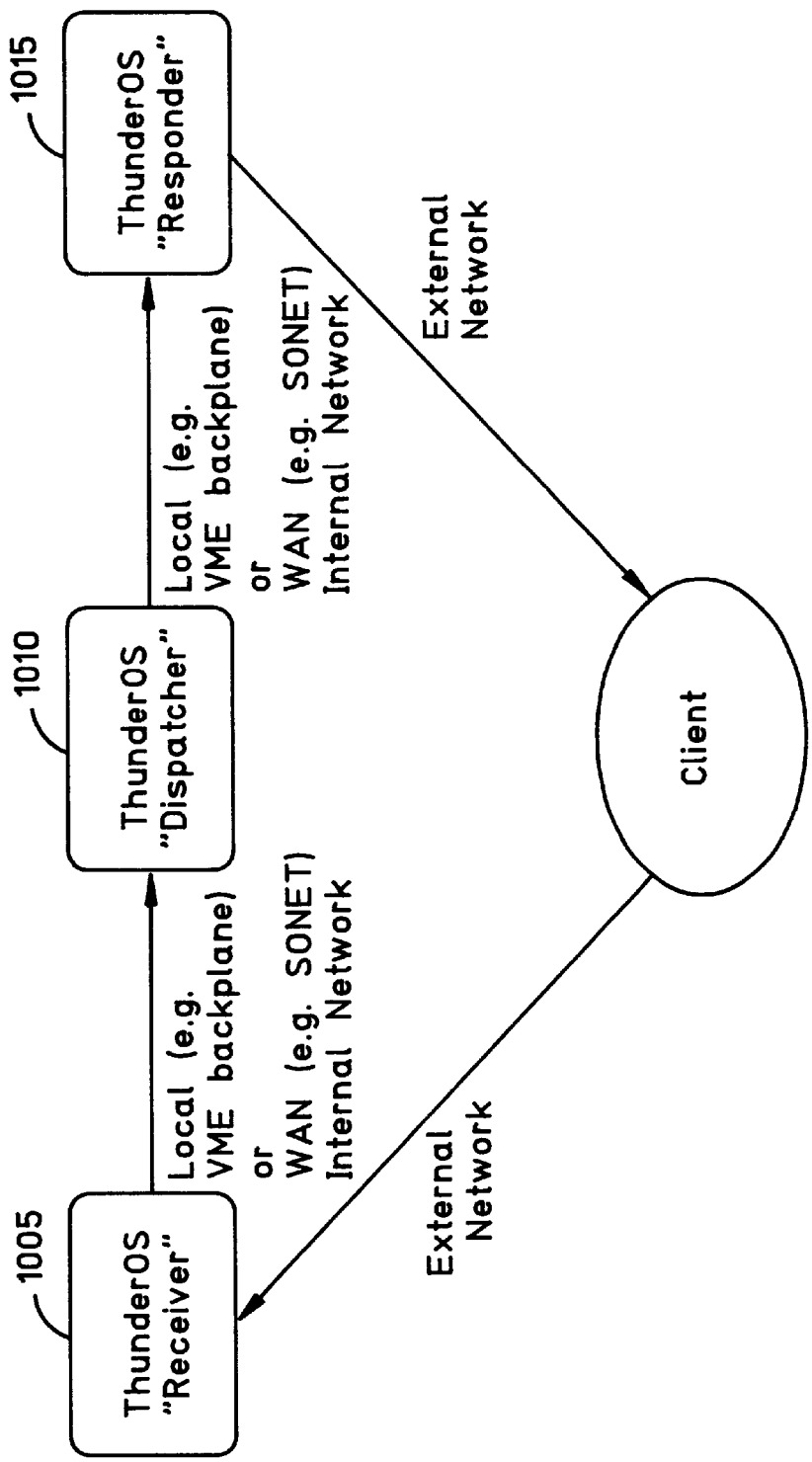
FIG. 10 is a block diagram illustrating distribution of functions between receiver, dispatcher, and responder members in accordance with an illustrative embodiment of the invention.

Distribution of the implementation of TCP in ThunderOS is described, with reference to FIG. 10, as follows. The creation of a connection (TCP's "three way handshake") has a minimal dependence on the service, and requires only knowledge of which services to associate with given port numbers. This part of the TCP state machine is efficiently distributed to a separate member, which is the receiver member 1005. This receiver member is able to manage a large number of connections, and generally is not burdened with service specific processing.

Once a connection is established, a connection object is created on a dispatcher member 1010, and this object is associated with the current TCP port. The dispatcher (1) manages various aspects of the data transfer portion of the TCP specification, such as acknowledgments and retransmissions, and (2) invokes the appropriate service. The service functionality can exist on the dispatcher member, and/or on a different member (or members), and typically will be distributed on both the dispatcher member and at least one other class of member. Typically data generation and transmission aspects of the service will be carried out on a responder member, thereby relieving the dispatcher member of much of the processing.

The end of the chain is the responder member 1015. The responder requires only minimal communication with the dispatcher. This communication takes place in order for the responder to know which data to transmit, when to transmit the data, and how much of the data to transmit (or retransmit, in the case of time-outs). The responder does not need to maintain any persistent state information between invocations, because the dispatcher supplies the necessary connection state information to the responder on each invocation. Multiple responder members can be associated with a given dispatcher, thereby permitting multiple connections to be serviced in parallel. Additionally, multiple dispatchers can be associated with a given receiver member.

With ThunderOS, the data structures which associate client and server IP addresses and TCP ports with a connection object and with a given service, can be searched in a constant period of time. That is, the time to perform the lookup is independent of the number of currently active connections or the number of services. The lookup is performed to find the record containing the current connection state information associated with the connection identified by the client and server IP addresses and TCP port numbers. Host lookups are also accomplished in a constant period of time. This approach eliminates many of the limitations of conventional TCP implementations. Wherever possible, available memory is the only limitation to the number of active connections supported.

Prior art server software oftentimes handles multiple clients simultaneously by invoking a separate instance of the server process to handle each connection. Consequently, a large number of clients using relatively slow network interfaces can require a large amount of system resources, even if the actual servicing of the clients is trivial due to the low bandwidth of their connection. ThunderOS, on the other hand, uses a single-threaded event driven approach to manage incoming packets, in combination with distributed parallel execution to generate and transmit outgoing data. This approach permits the system to operate fast enough to respond to events (incoming network packets) in real time. Furthermore, distributing the data generation and transmission across multiple members allows the system to scale. This approach allows a single server to manage a much larger number of clients than would otherwise be possible.

State Information

Figure 12:
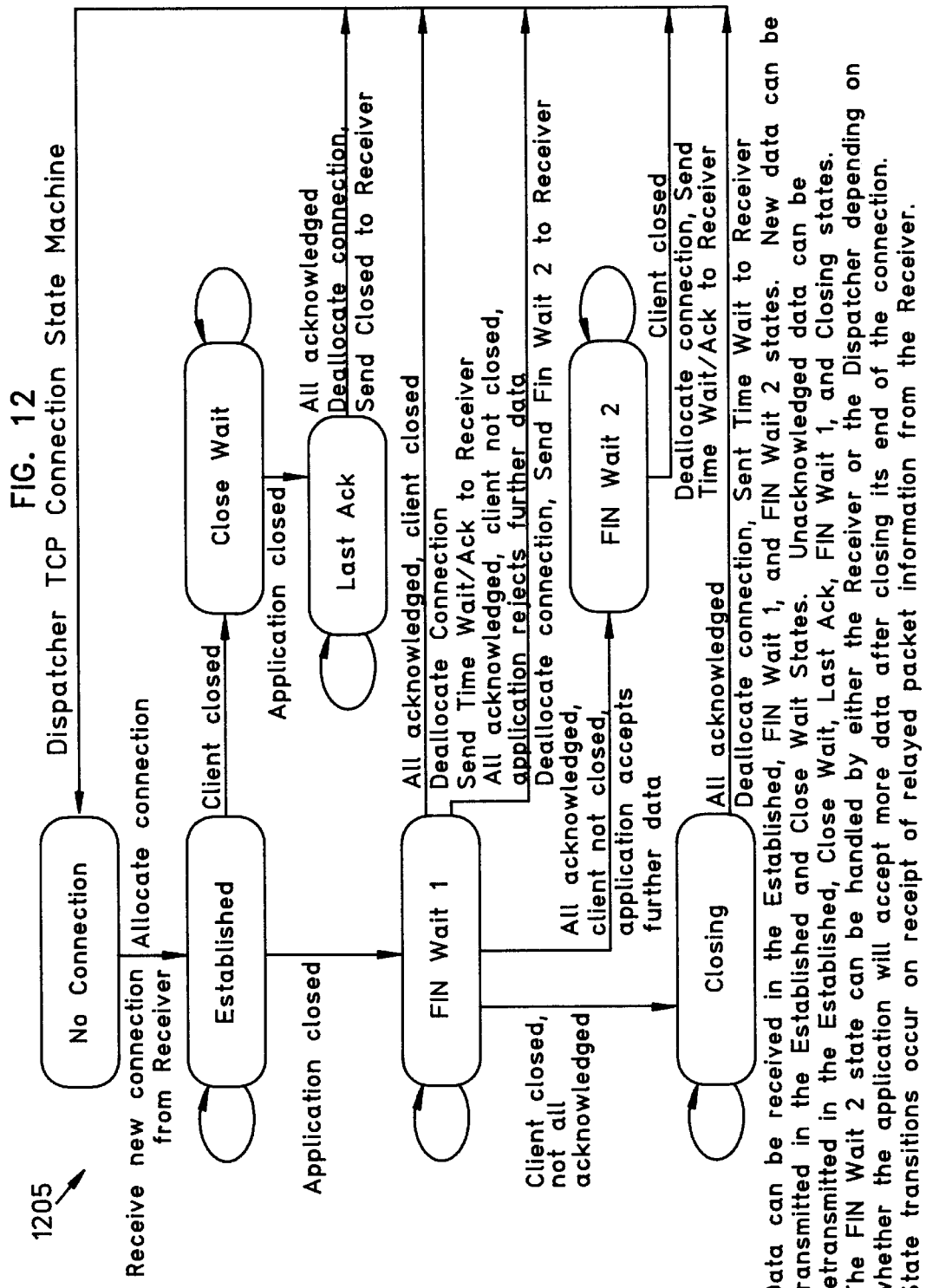
FIG. 12 is a diagram of a dispatcher TCP connection state machine, in accordance with an illustrative embodiment of the invention.

In order to service requests from clients, state information for each connection must be maintained. In ThunderOS this state information is maintained by the receiver and/or dispatcher. Different members can maintain portions of the state information at different times. Each member maintains only a portion of the overall state, and the entire state is stored across a plurality of members. TCP ports can be characterized as either, (1) listening for communication from a client, or (2) having an established connection. The absence of a connection is referred to as a closed state (not really a state), which is the entry point into the state machine. FIG. 11 illustrates a receiver TCP connection state machine 1105, and FIG. 12 illustrates a dispatcher TCP connection state machine 1205, for ThunderOS. These state machines are described in the following sections.

Receiver TCP Connection State Machine

The receiver's state machine 1105 in the ThunderOS embodiment is illustrated in FIG. 11. When a new connection is initiated by a client, the client sends a TCP packet (packet 1) with the SYN flag set in the TCP header. When the receiver receives such a packet with a destination IP address and TCP port that the receiver has been configured to listen to, and the receiver has not already allocated a data structure for this connection (as identified by both the source and destination IP address and TCP port numbers) the receiver creates a connection by allocating a new data structure to hold the state information for the connection. The receiver's connection trie data structure is then updated to reference this newly allocated structure, so that when a future packet with the same IP addresses and TCP ports is received, the existing data structure will be found. The newly allocated data structure is initialized to indicate the connection is in the SYN_RCVD state. The receiver then sends a packet (packet 2) back to the client acknowledging the received packet. This packet also has the SYN flag set as well as the ACK flag. When the receiver subsequently receives a packet (packet 3) acknowledging packet 2, it transitions to the DISPATCHER_RELAY state and sends a message to the dispatcher with the necessary information for the dispatcher to create a new connection state record. This completes the exchange known as TCP's "three-way handshake".

While a connection is in the DISPATCHER_RELAY state, the relevant data from any packets received by the receiver is simply forwarded to the dispatcher. The dispatcher informs the receiver whether the connection should remain in the DISPATCHER_RELAY state, whether it should transition to the FIN_WAIT2 state, or whether it should be closed. The dispatcher also informs the receiver whether any final acknowledgements or resets should be sent back to the client, and whether the TCP port should be marked as being in the TIME_WAIT state. For connections in the FIN_WAIT2 state, if the FIN flag is set in the incoming packet, the connection is closed and the port is marked as being in the TIME_WAIT state. Note that in conventional TCP implementations the TIME_WAIT state is an actual state of the state machine. In the ThunderTCP implementation, TIME_WAIT is indicated in a data structure that is outside of the scope of the state machine and which gets checked before the state machine is invoked. When a connection is closed on the receiver, the data structure that was allocated for the connection state information is released. The states SYN_RCVD, and FIN_WAIT2 correspond to the corresponding states of the state diagram contained in the TCP specification (RFC 793.) The state DISPATCHER_RELAY indicates that the connection is in one of the states that is handled by the dispatcher. Note that all data transfer occurs in this state and also that the receiver needs to perform very little processing for connections in this state. For server services; such as HTTP, that do not initiate connections to the client, the additional state of SYN_SENT is not used.

Dispatcher TCP Connection State Machine

The dispatcher's state machine 1205 in the ThunderOS embodiment is illustrated in FIG. 12. When the dispatcher receives a new connection from the receiver, it allocates a new data structure to hold the connection state information, and returns an identifier for the allocated structure to the receiver. This identifier will be used by the receiver to associate future messages with the connection. The state of the connection is set to ESTABLISHED and processing continues as for connections that are initially in the ESTABLISHED state.

For connections in the ESTABLISHED or CLOSE_WAIT state, the service specific code determines which responder will be used to acknowledge data received from the client and to send data to the client. The service specific code is responsible for instructing a responder to send the response data, along with the necessary TCP acknowledgment information back to the client. If the response data is not immediately available, only the acknowledgment, if needed, is sent. The amount of data that can be sent to the client is also limited by the TCP acknowledgment sequence number and window size sent by the client in each TCP packet.

For connections in the ESTABLISHED, FIN_WAIT_1, or FIN_WAIT_2 state, any data received from the client is passed on to the service associated with the connection. (The service specific processing can occur on the dispatcher itself, or can be distributed across other members.)

For connections in the ESTABLISHED state, if the client has closed its end of the connection, the connection state is set to CLOSE_WAIT. If the service has closed the server's end of the connection, the state is set to FIN_WAIT_1.

For connections in the CLOSE_WAIT state, if the service has closed the server's end of the connection, the state is set to LAST_ACK.

For connections in the LAST_ACK state, if the client has acknowledged all of the server's data, the connection state data structure is deallocated and the receiver is told to close the connection.

For connections in the FIN_WAIT_1 state, if the client has closed its end of the connection but has not acknowledged all of the server's data, the state is set to CLOSING. If the client has closed its end of the connection and has acknowledged all of the server's data then the connection state data structure is deallocated and the receiver is told to send a final acknowledgment and mark the connection as being in TIME_WAIT. If the client has not closed its end of the connection and has acknowledged all of the server's data and the service will accept further client data after closing the server's end of the connection, then the state is set to FIN_WAIT_2. If the client has not closed its end of the connection and has acknowledged all of the server's data and the service will not accept further client data after closing the server's end of the connection, then the connection state data structure is deallocated and the receiver is told to set its connection state to FIN_WAIT_2.

For connections in the FIN_WAIT_2 state, if the client has closed its end of the connection, then the connection state data structure is deallocated and the receiver is told to send a final acknowledgment and mark the connection as being in TIME_WAIT.

For connections in the CLOSING state, if the client has acknowledged all of the server's data, then the connection state data structure is deallocated and the receiver is told to mark the connection as being in TIME_WAIT.

In accordance with the TCP specification, when data is transmitted, a timer is started. If the timer expires before the data is acknowledged by the client, the appropriate responder is notified to retransmit the necessary data. Acknowledgment time-outs and TCP reset messages can also cause a connection to be closed.

Distributed TCP/IP Implementation in ThunderOS

The ThunderOS embodiment of a distributed TCP/IP implementation allows multiple members and their associated external network interfaces to collectively service a single IP address. Specifically, the TCP/IP state machine is distributed across one receiver and one or more responders (and preferably one or more dispatchers), so that an IP address is serviced by a receiver and one or more responders (and preferably one or more dispatchers). The existence of multiple responders, with their associated external network interfaces, allows the ThunderOS embodiment of a distributed TCP/IP implementation to transmit data at rates that would exceed the capabilities of a single external network interface. Adding additional responders to a server increases the server's capacity to transmit data for the service or services associated with a specific IP address.

Alternative Embodiment of Distributed TCP/IP Implementation

Figure 13:
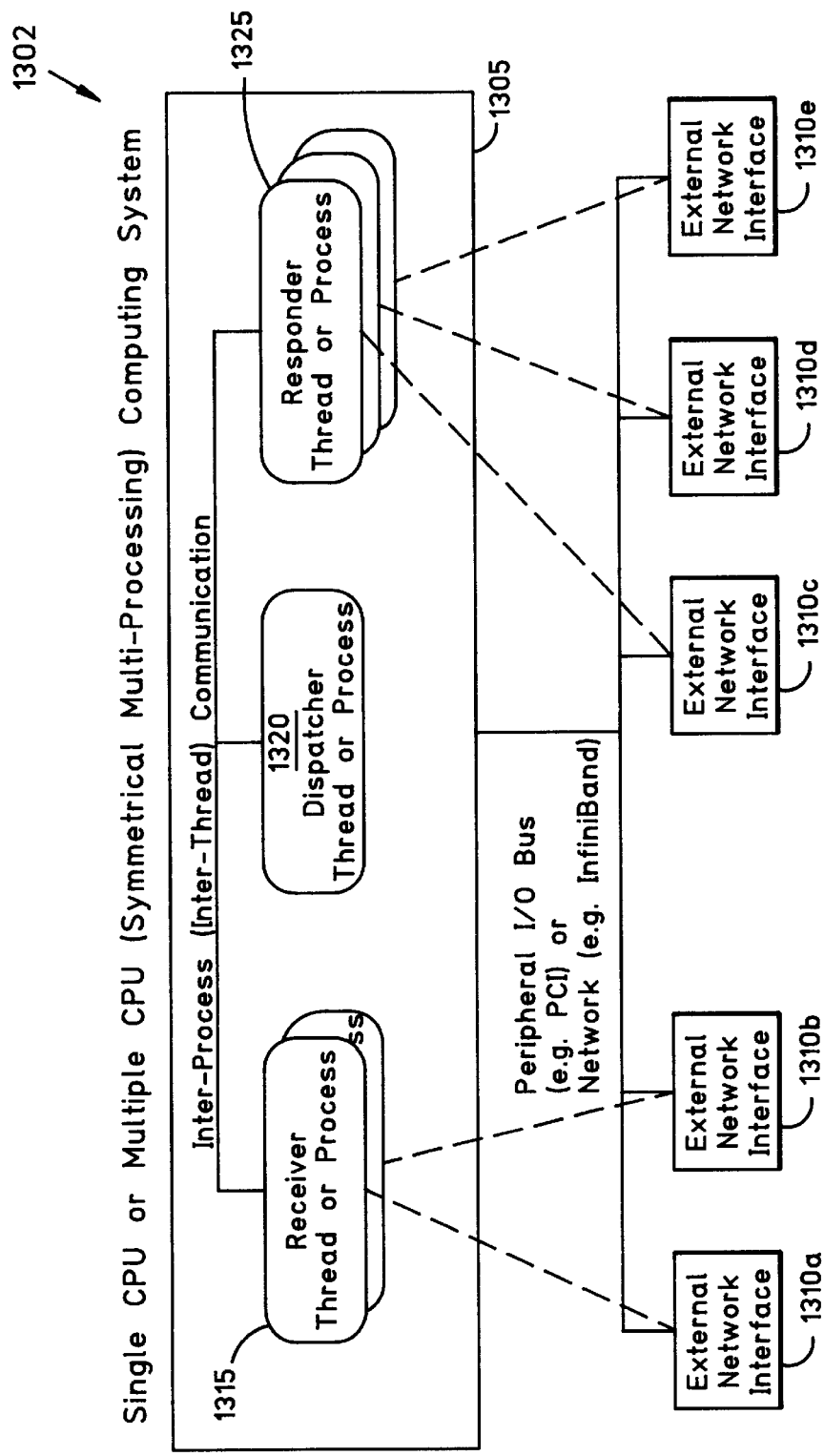
FIG. 13 is a block diagram illustrating an distributed TCP/IP computing system in accordance with an illustrative embodiment of the invention.

Another embodiment of a distributed TCP/IP implementation, illustrated in FIG. 13, does not require the Federated OS but can be implemented on a single computer 1302 with one or more CPUs 1305, with a plurality of external network interfaces 1310a–1310e, and with or without an operating system. In this embodiment, one or more receivers 1315, one or more dispatchers 1320 and one or more responders 1325 are implemented as processes or threads executing on the computer. Because these processes or threads execute on a single computer they can communicate among themselves without requiring an internal network. This communication is achieved through shared memory, message queues, or other inter-process or inter-thread communication method. The receiver, dispatcher and responder processes or threads in this embodiment perform similarly to the receiver, dispatcher and responder members described in the ThunderOS embodiment of a distributed TCP/IP implementation. Thus, methods for initializing a server, and methods for responding to requests in this alternative embodiment, are implemented analogously to the methods in the ThunderOS embodiment. Specifically, the servicing of a single IP address is distributed across a receiver process or thread, one or more dispatcher processes or threads, and one or more responder processes or threads. A dedicated external network interface is coupled to the receiver process or thread, and one or more dedicated external network interfaces are coupled to each responder. Collectively these processes or threads, with their dedicated external network interfaces, provide services for one or more IP addresses. The servicing of a single IP address is not processed by a single external network interface but rather is distributed among multiple external network interfaces. A single receiver can service one or more IP addresses. Preferably, a receiver is coupled to a single external network interface, although multiple external network interfaces can be coupled to a single receiver.

A variation of the preceding embodiment of a distributed TCP/IP implementation also does not require the Federated OS, but can be implemented on multiple computers. Each computer has one or more CPUs, one or more internal network interfaces, and one or more external network interfaces. Each computer can operate with or without an operating system. In each computer, preferably the internal network interface and the external network interface are not a shared single interface, but preferably are separate distinct interfaces. In this embodiment, one or more receivers, one or more dispatchers, and one or more responders are implemented as processes or threads executing on each computer. Preferably, each of these processes or threads executes on a dedicated computer. Preferably, these processes or threads communicate among themselves using an internal network. The internal network can be any wireline, wireless, optical, or other networking system that can interconnect computers, for example, Ethernet, Gigabit Ethernet, Token Ring, Fibre Channel, or InfiniBand. The receiver, dispatcher and responder processes or threads in this embodiment perform similarly to the receiver, dispatcher and responder members described in the ThunderOS embodiment of a distributed TCP/IP implementation discussed herein. Thus, methods for initializing a server, and methods for responding to requests in this alternative embodiment, are implemented analogously to the methods in the ThunderOS embodiment. Specifically, the servicing of a single IP address is distributed across a receiver process or thread, one or more dispatcher processes or threads and one or more responder processes or threads. Preferably, a dedicated external network interface is coupled to the receiver process or thread, and one or more dedicated external network interfaces are coupled to each responder. Collectively these processes or threads, with their (preferably) dedicated external network interfaces, provide services for one or more IP addresses. The servicing of a single IP address is not processed by a single computer or a single external network interface but rather is distributed among multiple computers and multiple external network interfaces. A single receiver can service one or more IP addresses. Preferably, a receiver is coupled to a single external network interface, although multiple external network interfaces can be coupled to a single receiver.

Alternative distributed TCPP/IP embodiments need not include a dispatcher process or thread but rather can incorporate the dispatcher functionality in the receiver and/or responder processes or threads.

Methods of Configuration and Operation

Prior to processing requests from clients, the server is configured by the configurator. Although configuration by the configurator could be automatic, configuration is typically accomplished by the configurator in response to operator input. The operator can either manually enter the configuration data, or load a previously saved configuration.

The operator then initiates the loading of the configuration onto the server. The selected configuration identifies which OS member OS instance will be loaded onto each participating member hardware unit.

Figure 14A:
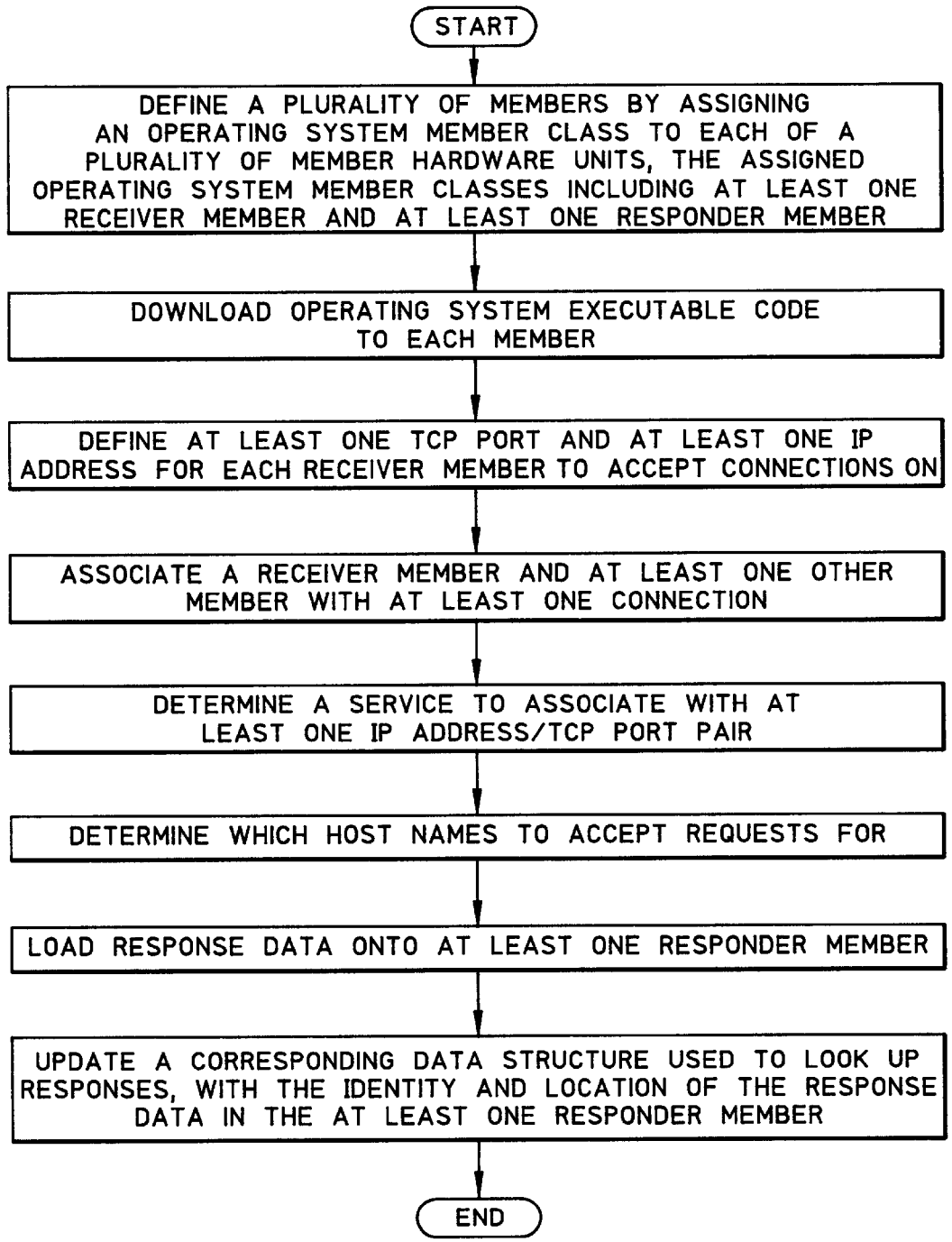
FIG. 14A is a flow chart illustrating a method for initializing a server in accordance with an illustrative embodiment of the invention.
Figure 14B:
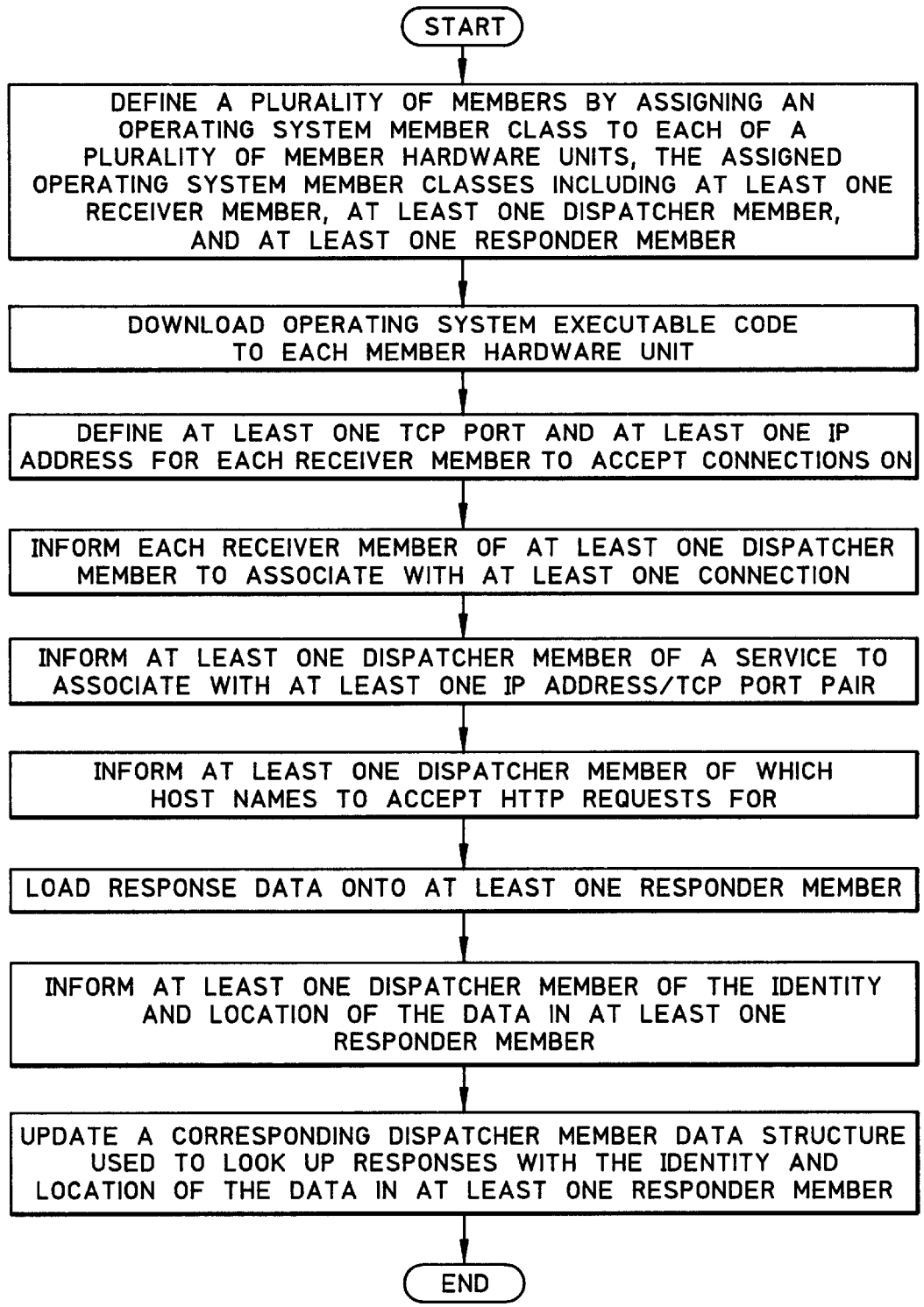
FIG. 14B is a flow chart illustrating a method for initializing a server in accordance with another illustrative embodiment of the invention.

A typical example of configuring a server is as follows: A receiver, a dispatcher and a number of responders are designated. In some alternative embodiments, no dispatchers are designated, and dispatcher functionality is implemented on a receiver and/or a responder. In these alternative embodiments, acts that would have been performed by a dispatcher are performed by one or more receivers and/or one or more responders. After the members are designated, the appropriate executable code is then downloaded to those member hardware units and is executed. The receiver is then told what IP addresses and TCP port numbers to accept connections on, and which dispatchers to associate with those connections. The dispatcher is then told what services to associate with each of those IP address/TCP port pairs. For the HTTP service, the dispatcher is also told which host names to accept requests for. The response data is then loaded onto the responders. This can be raw static data, and/or executable code that is to be run to generate dynamic data. As each response is loaded, the dispatcher is informed of its location. As soon as the dispatcher is informed of the location of the response, it updates its data structure used to lookup responses, so that the server is ready to serve that response the next time a client requests it. FIG. 14A is a flow chart illustrating a method for initializing a server in accordance with an illustrative embodiment of the invention. FIG. 14B is a flow chart illustrating a method for initializing a server in accordance with another illustrative embodiment of the invention.

Figure 15:
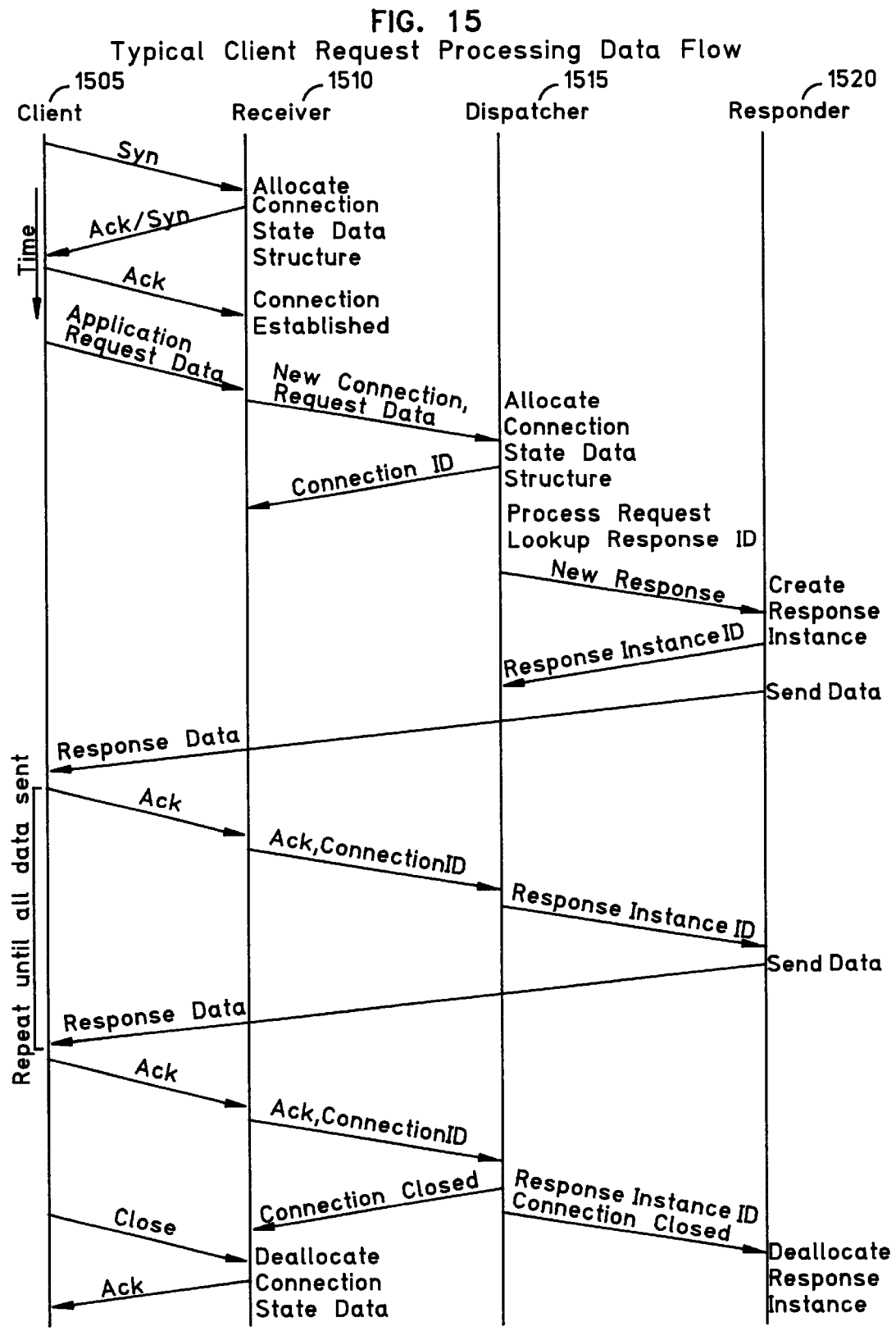
FIG. 15 is a diagram illustrating data flow between a client, receiver, dispatcher, and responder, to service a client request in accordance with an illustrative embodiment of the invention.

FIG. 15 illustrates data flow between the client 1505, receiver 1510, dispatcher 1515, and responder 1520, for servicing a request from the client, in the ThunderOS embodiment. A typical transaction between a client and a server proceeds as follows: A client initiates a request which results in a connection being established by exchanging a number of TCP packets between the client and a receiver member of the server. As each packet is received, the receiver must lookup the IP addresses and TCP ports contained in the packet and determine if they correspond with an existing connection. Preferably this lookup is implemented using the "Trie" data structure to provide deterministic execution time, regardless of how many active connections the receiver is maintaining.

If the connection successfully reaches the "established" state, the client can then send data containing the actual request information. The receiver pulls out headers from received data, and also pulls out the payload, and passes the payload "as is" to the dispatcher. For an HTTP request, the data (payload) includes the HTTP header (which includes, for example, a command to get data at a specified URL), and the HTTP payload data if any. When the receiver receives the packet with this data, it sends the data to the dispatcher. When the dispatcher receives the request data for a new connection, it allocates a data structure to hold the state of the connection and returns an identifier to the receiver which allows the receiver to associate future data with this connection on the dispatcher. The receiver saves this identifier in its data structure associated with this connection.

The dispatcher then processes the request data to determine what response to send. Preferably, part of this processing uses the "Trie" data structure to efficiently locate the correct response. Based on the data record resulting from this search, the dispatcher sends a message to the appropriate responder telling it to send some of the data back to the client. (The amount of data the client is ready to receive, as well as acknowledgements of what data the client has already received, are part of the information contained in every TCP packet sent by the client.) The responder replies to the dispatcher with an identifier to identify the unique instance of the response associated with this connection. This is necessary for dynamic data where each connection would result in possibly different data being returned in response to identical requests. The responder also tells the dispatcher the size of the response data, if known, so that the dispatcher can determine when the complete response has been sent. The dispatcher uses the size of the response data when calculating the next sequence number. The responder sends the response data to the client.

When the client receives the response data packets, it sends acknowledgement packets back to the receiver, which indicate what data the client has successfully received and how much more data it is now willing to accept. The receiver receives this packet and performs the IP address and TCP port lookup again, and determines that this packet belongs to an established connection. The receiver then sends the necessary information from the packet, along with the connection identifier previously saved for this connection, to the dispatcher. The dispatcher receives this message and uses the identifier to locate the appropriate connection state information. The dispatcher then uses the acknowledgement information along with the saved state information to determine what portion of the data can now be sent. Sequence numbers in the dispatcher are incremented by the number of transmitted bytes. The dispatcher then sends a message to the appropriate responder. This message contains the previously saved response identifier along with the information indicating what portion of the data to send. The dispatcher also maintains timers that cause it to tell the responders to resend data that has not been acknowledged within the appropriate amount of time. The client again receives this data and sends the next acknowledgement.

Figure 16A:
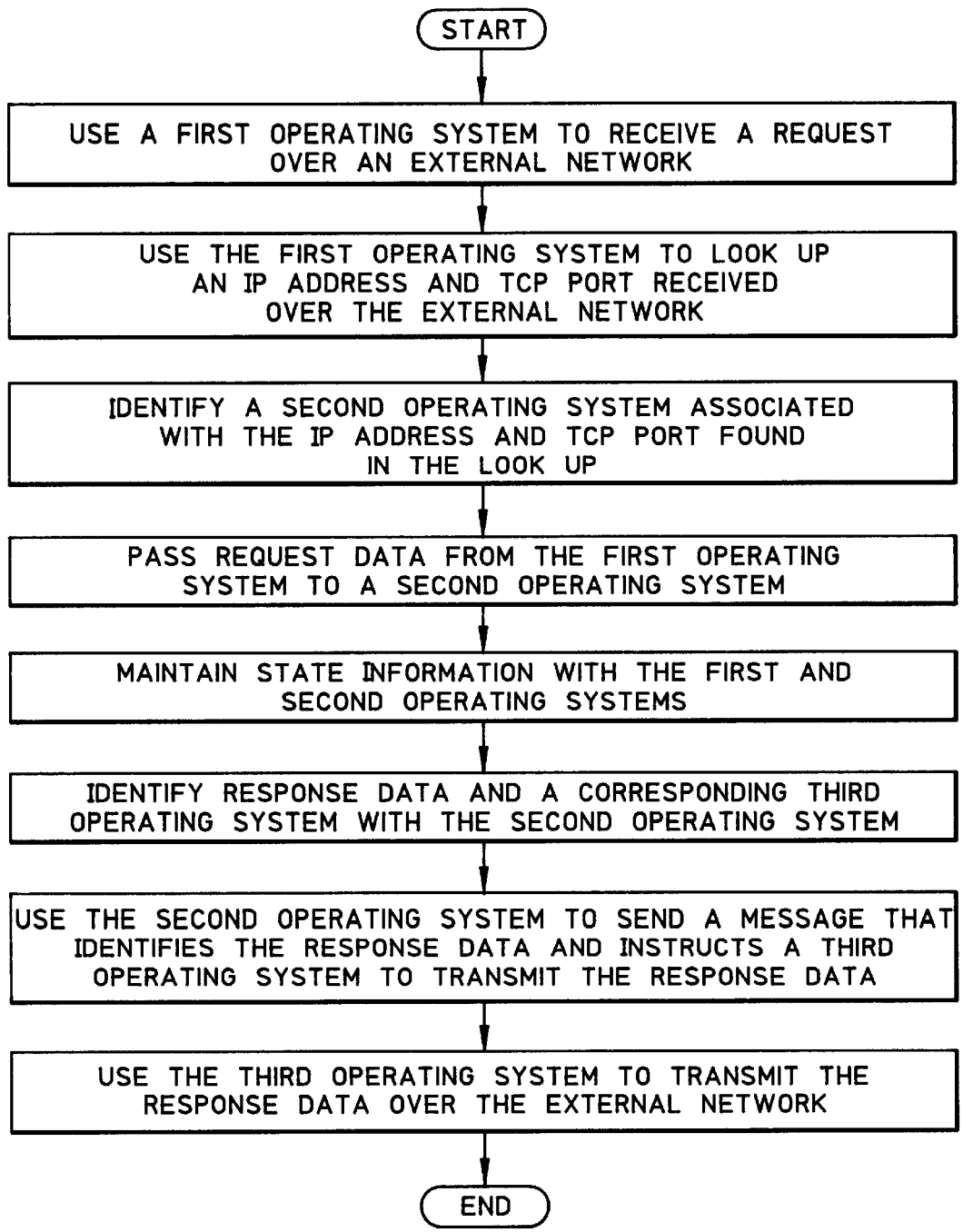
FIG. 16A is a flow chart illustrating a method for responding to a request received over an external network in accordance with an illustrative embodiment of the invention.
Figure 16B:
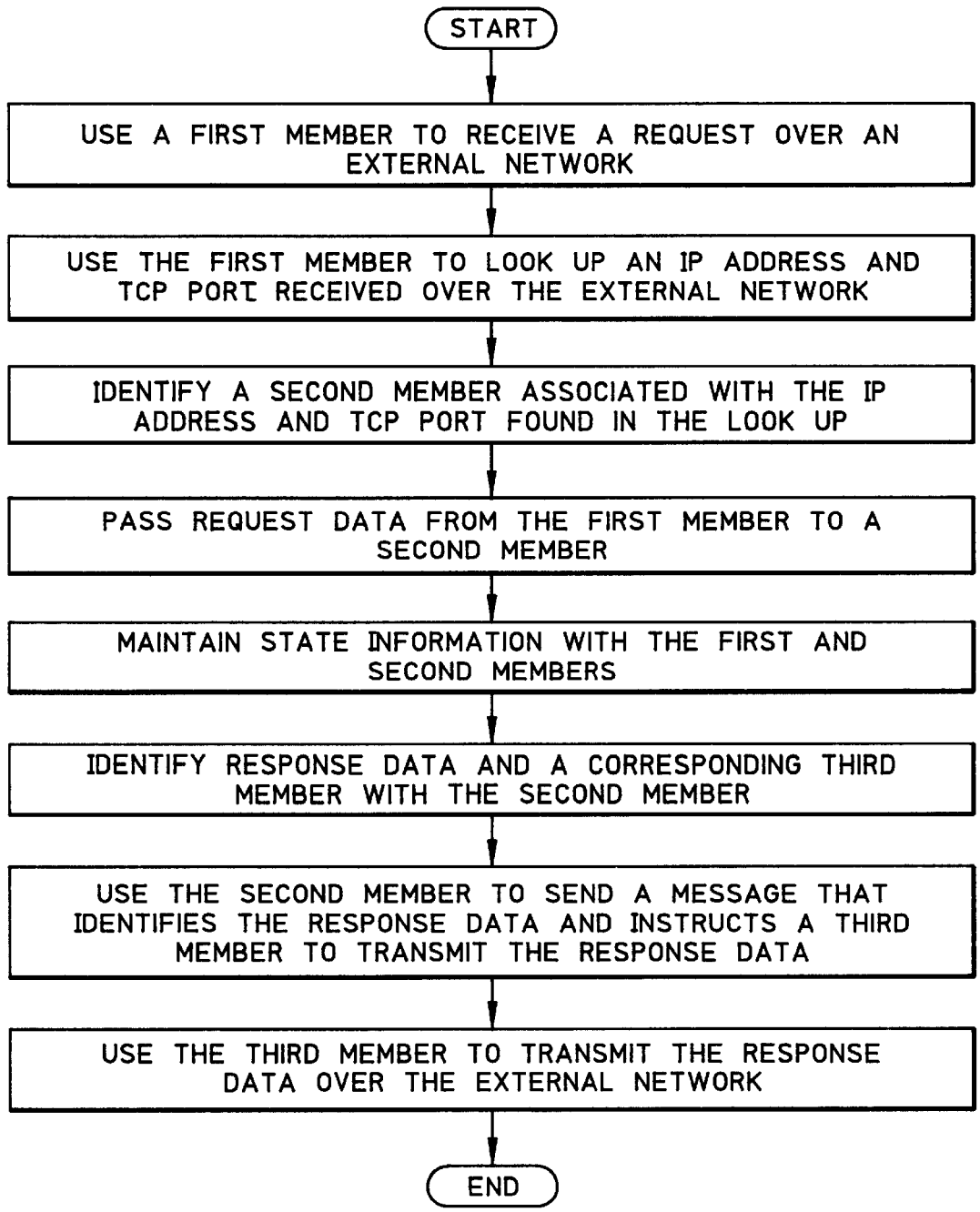
FIG. 16B is a flow chart illustrating a method for responding to a request received over an external network in accordance with another illustrative embodiment of the invention.
Figure 16C:
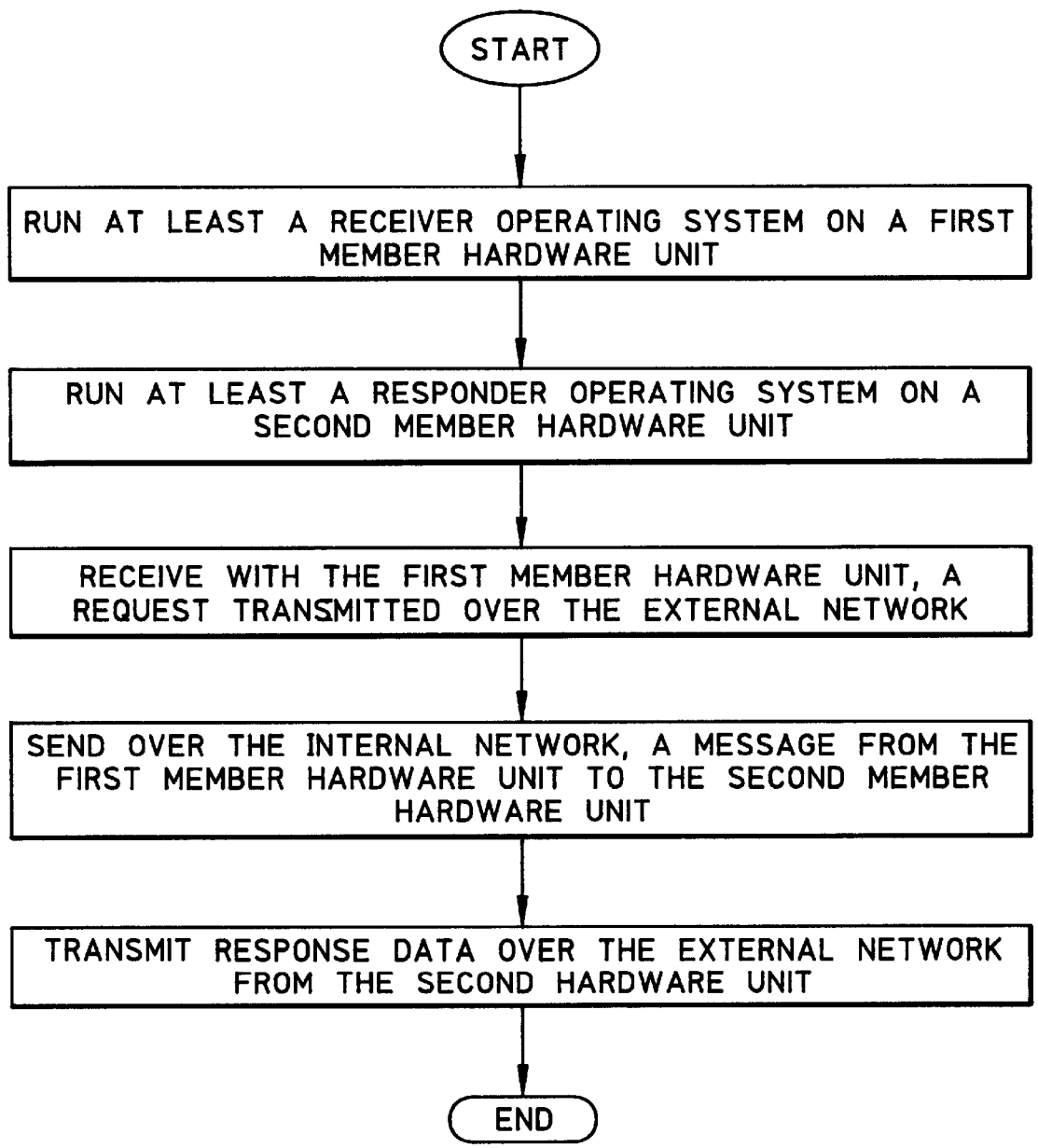
FIG. 16C is a flow chart illustrating a method for responding to a request received over an external network in accordance with another illustrative, embodiment of the invention.
Figure 16D:
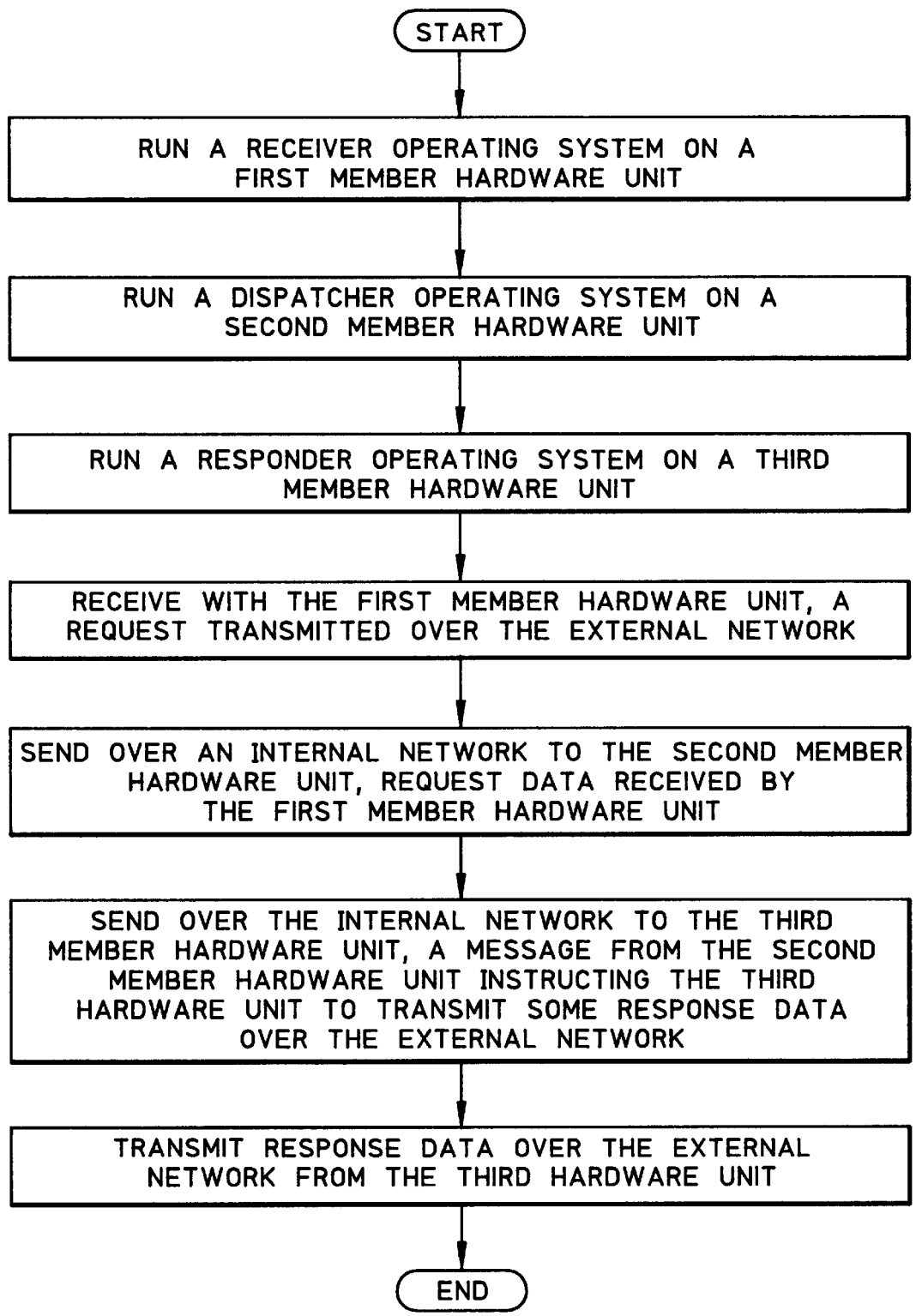
FIG. 16D is a flow chart illustrating a method for responding to a request received over an external network in accordance with another illustrative embodiment of the invention.

This cycle continues until all of the response data has been sent by the responder and acknowledged by the client, at which time the dispatcher informs the receiver that the connection is to be closed. The dispatcher also informs the responder that the unique instance of the response for this connection is no longer needed. And finally, the dispatcher deallocates the data structure containing the state information for this connection. The final closing of the connection involves a few more packets being exchanged between the client and the receiver, after which the receiver deallocates its data structure containing the state information for the connection. Error conditions, cancelled requests, etc., result in processing in addition to that described above. FIG. 16A is a flow chart illustrating a method for responding to a request received over an external network in accordance with an illustrative embodiment of the invention. FIG. 16B is a flow chart illustrating a method for responding to a request received over an external network in accordance with another illustrative embodiment of the invention. FIG. 16C is a flow chart illustrating a method for responding to a request received over an external network in accordance with another illustrative embodiment of the invention. FIG. 16D is a flow chart illustrating a method for responding to a request received over an external network in accordance with another illustrative embodiment of the invention.

Signal Bearing Medium

Another aspect of the invention is a signal bearing medium tangibly embodying machine-readable code executable by a digital processing apparatus for implementing any of the embodiments of a server or digital computer system described herein. Another aspect of the invention is a signal bearing medium tangibly embodying a program of machine-readable instructions executable by a digital processing apparatus to perform any method described herein, including for example, methods for responding to a request received over an external network, methods for responding to a request (that does not have to be received over an external network), or methods for initializing a server. In a preferred embodiment of the invention, the machine-readable code comprises software object code.

Figure 17:
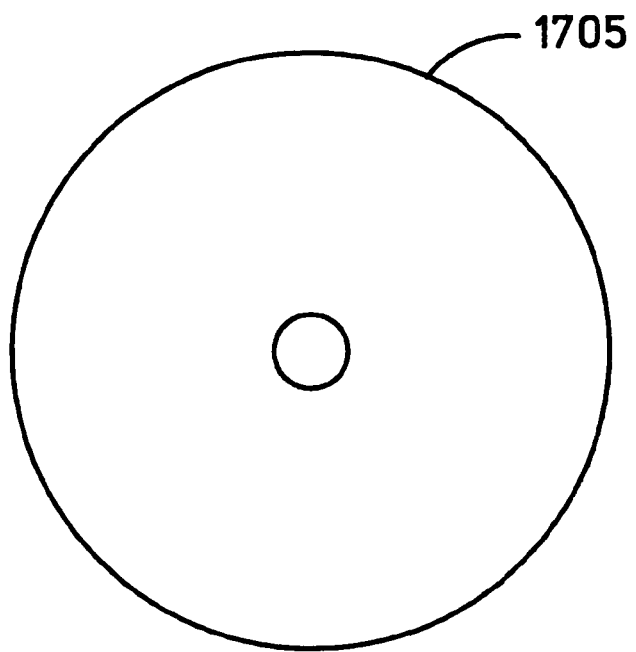
FIG. 17 is a top view of a signal bearing optical disc in accordance with an illustrative embodiment of the invention.

The code may reside in one or more of various types of signal-bearing media. For example, the code may be embodied in a signal-bearing medium such as optical disc 1705 shown in FIG. 17. The optical disc can be any type of signal bearing disc, for example, a CD-ROM, CD-R (a recordable CD-ROM that can be read on a CD-ROM drive), CD-RW (multiple-write CD), CD-E (recordable and erasable CD), or DVD (digital video disc), and typically will be a CD-ROM. Alternatively, instead of, or in addition to an optical disc, the signal bearing medium may include one or more of the following: a magnetic data storage diskette (floppy disk), a Zip disk, DASD storage (e.g., a conventional "hard drive" or a RAID array), magnetic tape, RAM, electronic read-only memory (e.g., ROM, EPROM, or EEPROM), paper punch cards, or transmission media such as digital and/or analog communication links.

Pseudo Code

The following pseudo code describes the implementation of an illustrative TCP/IP embodiment of the Federated OS, which includes Thunder OS and illustrative member classes:

```
Receiver event loop pseudo code:
loop forever
    Get next event
    If event is received IP datagram
    If the IP datagram contains a valid TCP segment
        Search active connection list for match of TCP seg-
        ment's IP addresses/TCP ports
        If found
            If connection state is Syn Received
            If TCP segment has valid sequence numbers
                If TCP reset flag is set
                    remove connection from active connection list
                    deallocate connection
                Else
                If TCP Syn flag is set
                    send TCP reset to client
                    remove connection from active connection list
                    deallocate connection
                Else
                If TCP acknowledge is valid
                    send new connection message to Dispatcher
                    store Dispatcher's connection ID in connection
                    object
                    set connection state to Dispatcher Relay
                Else
                    send TCP reset to client
                Else
                If TCP reset flag is not set
                    send TCP Ack to client
            If connection state is Relay to Dispatcher
            send connection ID and segment data to Dispatcher
            If Dispatcher's reply is Time Wait
                remove connection from active connection list
                add connection to Time Wait list
            If Dispatcher's reply is Time Wait/Ack
                send TCP Ack to client
                remove connection from active connection list
                add connection to Time Wait list
            If Dispatcher's reply is Closed or Reset
                remove connection from active connection list
            If Dispatcher's reply is Fin Wait 2
                set connection state to Fin Wait 2
            If connection state is Fin Wait 2
            If TCP segment has valid sequence numbers
                If TCP reset flag is set
                    remove connection from active connection list
                    deallocate connection
                Else
                If TCP Syn flag is set
                    send TCP reset to client
                    remove connection from active connection list
                    deallocate connection
                Else
                If TCP acknowledge is valid
                If TCP Fin flag is set or segment has new data
                    send TCP Ack to client
                If TCP Fin flag is set
                    remove connection from active connection list
                    add connection to Time Wait list
                Else
                    send TCP reset to client
                Else
                If TCP reset flag is not set
                    send TCP Ack to client
            Else (connection not found in active connection
            list)
                If TCP segment Reset flag is clear
        Search Time Wait list for match of TCP segment's IP
        addresses/TCP ports
        If found
            send TCP reset to client
        Else
            If TCP reset flag is not set
            If TCP segment SYN flag is set and Ack flag is not
            set
        Search active service list for match of destination IP
        address/TCP port
        If service found
            Allocate and initialize new connection
            store service ID in connection object
            set connection state to Syn Received
            Insert new connection in active connection list
            send TCP Syn/Ack to client
            start retransmission timer
        Else
            send TCP reset to client
        Else
            send TCP reset to client
    If the IP datagram contains a valid ICMP segment
        Process ICMP segment
    If event is retransmission timeout
    If state of timed out connection is Syn Received
        Update connection establishment timeout
        If connection establishment time exceeded
        send TCP reset to client
        remove connection from active connection list
        deallocate connection
        Else
        resend TCP Syn/Ack to client
        restart retransmission timer for this connection
    If event is Time Wait timeout
    remove connection from Time Wait list
```

If event is service configuration message
  Install or remove service data
If event is system status query
  Reply with system and specific service status
If event is system reboot message
  Load and run new system executable code
If event is system shutdown message
  Halt processor event loop pseudo code:
loop forever
  Get next event
  If event is received new connection message
    allocate new connection
    initialize new connection with TCP segment info and service ID from received message
    send reply with connection ID to receiver
    If TCP Fin flag is set
      set connection state to Close Wait
    Else
      set connection state to Established
    send data from TCP segment to service referenced in connection message
    set connection's response ID to value returned by service
    send message to Responder to send TCP ack and optional response data to client
    start retransmission timer
  If event is received segment for existing connection message
    update connection info from message data
    If TCP Reset flag is set
      send Closed reply to Receiver
      deallocate connection
    Else
      If TCP Syn flag is set
        send Reset reply to Receiver
        deallocate connection
      Else
        If TCP segment has invalid sequence numbers
          send message to Responder to send TCP ack to client
        Else
          If TCP Ack flag is set
          stop retransmission timer for acknowledged data
          If connection state is Established
            send new data from TCP segment to response referenced by response ID
            If clients receive window has available space
              send message to Responder to send TCP ack and additional response data
          Else
            If new data was received
              send message to Responder to send TCP ack to client
            If Fin has been sent by the responder and acknowledged by the client
              If TCP Fin flag is set
                send Time Wait/Ack reply to Receiver
                deallocate connection
              Else
                send Fin Wait 2 reply to Receiver
                deallocate connection
            If Fin has been sent by Responder but not acknowledged
              If TCP Fin flag is set
                set connection state to Closing
              Else
                set connection state to Fin Wait 1
            If Fin has not been sent by Responder and TCP Fin flag is set
              set connection state to Close Wait
          If connection state is Close Wait
            send new data from TCP segment to response referenced by response ID
            If clients receive window has available space
              send messsage to Responder to send TCP ack and additional response data
            If Fin has been sent by Responder
              set connection state to Last Ack
          If connection state is Closing
            If Fin has been sent by the responder and acknowledged by the client
              send Time Wait reply to Receiver
              deallocate connection
          If connection state is Fin Wait 1
            send new data from TCP segment to response referenced by response ID
            If Fin has been sent by the responder and acknowledged by the client
              If TCP Fin flag is set
                send Time Wait/Ack reply to Receiver
                deallocate connection
              Else
                If new data was received
                  send message to Responder to send TCP ack to client
                If response accepts further data
                  set connection state to Fin Wait 2
                Else
                  send Fin Wait 2 reply to Receiver
                  deallocate connection
            Else
              If TCP Fin flag is set
                set connection state to Closing
          If connection state is Fin Wait 2
            send new data from TCP segment to response referenced by response ID
            If TCP Fin flag is set
              send Time Wait/Ack reply to Receiver
              deallocate connection
            Else
              If new data was received
                send message to Responder to send TCP ack to client
          If connection state is Last Ack
            If Fin has been sent by the responder and acknowledged by the client
              send Closed reply to Receiver
              deallocate connection
  If event is retransmission timeout
    send Resend Packet message to Responder
    restart retransmission timer for this connection
  If event is service configuration message
    Install or remove service data
  If event is system status query
    Reply with system and specific service status If event is system reboot message
Load and run new system executable code
If event is system shutdown message
Halt processor It will be apparent to persons skilled in the art that various changes and modifications can be made to the illustrative embodiments of the invention described herein without departing from the scope of the invention as defined by the claims.

What is claimed is:

1. A method for responding to a request received over an external network, comprising:
   running a receiver operating system on a first member hardware unit;
   running a dispatcher operating system on a second member hardware unit;
   running a responder operating system on a third member hardware unit;
   receiving, with the first member hardware unit, a request transmitted over the external network;
   sending over an internal network, to the second member hardware unit, request data received by the first member hardware unit, wherein the request data includes an http header;
   sending over the internal network, to the third member hardware unit, a message from the second member hardware unit instructing the third member hardware unit to transmit some response data over the external network;
   transmitting response data over the external network from the third hardware unit;
   identifying, with the second member hardware unit, the correct response to the request;
   identifying, with the second member hardware unit, the third member hardware unit that has the correct response data out of a plurality of member hardware units having response data, and sending to the third member hardware unit the message instructing the third member hardware unit to transmit some response data over the external network; and
   transmitting, information identifying the unique instance of the response associated with the connection, and information indicating the size of the response data, from the third member hardware unit to the second member hardware unit over the internal network.

2. The method of claim 1 further comprising monitoring, with a guardian member, the condition of at least one member.

3. The method of claim 2 further comprising changing the functionality of a member from one member class to another member class.

4. The method of claim 2 wherein requests are processed in real time.

5. The method of claim 4 wherein IP address lookups are accomplished in real time.

6. The method of claim 5 further comprising providing a non real time operating environment as a task of a real time operating environment.

7. The method claim 6 further comprising running different portions of an HTTP server on different operating systems of the plurality of the operating systems.

8. The method of claim 7 further comprising:
   looking up an IP address and TCP port contained in the request to determine if they correspond with an existing connection;
   establishing a connection with a requesting client if a connection is not already established;
   allocating a data structure in the second member hardware unit, to hold state information regarding the connection;
   transmitting a connection identifier from the second member hardware unit to the first member hardware unit; and
   allocating a data structure in the first member hardware unit, to hold state information regarding the connection.

9. The method of claim 8 further comprising:
   receiving, with the first member hardware unit, an acknowledgement from a client;
   determining, with the second member hardware unit, that all of the response data has been acknowledged by the client;
   sending a message, over the internal network, from the second member hardware unit to the first member hardware unit, informing the first member hardware unit that a connection is to be closed;
   sending a message, over the internal network, from the second member hardware unit to the third member hardware unit, informing the third member hardware unit that the unique instance for the response for the connection is no longer needed;
   deallocating a data structure in the second member hardware unit containing state information for the subject connection with the client; and
   closing the connection and deallocating, in the first member hardware unit, a data structure containing state information for the connection.

10. The method claim 9 further comprising configuring a server by:
    assigning a receiver member class to at least one member hardware unit;
    assigning a dispatcher member class to at least one member hardware unit; and
    assigning a responder member class to at least one member hardware unit.

11. A method for initializing a server, comprising:
    defining a plurality of members by assigning an operating system member class to each of a plurality of member hardware units, the assigned operating system member classes including at least one receiver member, and at least one responder member;
    downloading operating system executable code to each member;
    defining at least one TCP port and at least one IP address for each receiver member to accept connections on;
    associating a receiver member and at least one other member with at least one connection;
    determining a service to associate with at least one IP address/TCP port pair;
    determining which host names to accept requests for;
    loading response data onto at least one responder member; and
    updating a corresponding data structure used to lookup responses with the identity and location of the response data in the at least one responder member.

12. A method for initializing a server, comprising:

defining a plurality of members by assigning an operating system member class to each of a plurality of member hardware units, the assigned operating system member classes including at least one receiver member, at least one dispatcher member, and at least one responder member;

downloading operating system executable code to each member;

defining at least one TCP port and at least on IP address for each receiver member to accept connections on;

informing each receiver member of at least one dispatcher member to associate with at least one connection;

informing at least one dispatcher member of a service to associate with at least one IP address/TCP port pair;

informing at least one dispatcher member of which host names to accept HTTP requests for;

loading response data onto at least one responder member;

informing at least one dispatcher member of the identity and location of the data in at least one responder member, and updating a corresponding dispatcher member data structure used to lookup responses, with the identity and location of the data in the at least one responder member.

* * * * *